US012669304B1

(12) United States Patent
Smith

(10) Patent No.: US 12,669,304 B1
(45) Date of Patent: Jun. 30, 2026

(54) FOREARM SHOOTING STICK SUPPORT AND STORAGE ASSEMBLY

(71) Applicant: David Wayne Smith, Elkins, WV (US)

(72) Inventor: David Wayne Smith, Elkins, WV (US)

( * ) Notice: Subject to any disclaimer, the term of this patent is extended or adjusted under 35 U.S.C. 154(b) by 285 days.

(21) Appl. No.: 18/431,957

(22) Filed: Feb. 3, 2024

Related U.S. Application Data

(60) Provisional application No. 63/499,673, filed on May 2, 2023, provisional application No. 63/576,641, filed on Feb. 23, 2023.

(51) Int. Cl.
| | |
|---|---|
| *F41A 23/16* | (2006.01) |
| *F41A 23/04* | (2006.01) |
| *G03B 17/56* | (2021.01) |
| *F41B 5/14* | (2006.01) |

(52) U.S. Cl.
CPC .............. *F41A 23/16* (2013.01); *F41A 23/04* (2013.01); *G03B 17/561* (2013.01); *F41B 5/1453* (2013.01)

(58) Field of Classification Search
CPC .......... F41A 23/16; F41A 23/04; F41A 23/06; F41A 23/08; F41A 23/10; F41C 33/001; G03B 17/561; F16M 13/04; F41B 5/1453
USPC ...................................... 248/118, 155; 42/94
See application file for complete search history.

(56) References Cited

U.S. PATENT DOCUMENTS

| | | | | | |
|---|---|---|---|---|---|
| 3,009,612 | A | * | 11/1961 | Fischett ................. | A01K 97/10 |
| | | | | | 224/907 |
| 3,191,826 | A | * | 6/1965 | Adams .................... | F41C 23/12 |
| | | | | | 224/913 |

| | | | | | |
|---|---|---|---|---|---|
| 3,225,656 | A | * | 12/1965 | Flaherty ................. | F41A 23/06 |
| | | | | | 89/37.04 |
| 3,390,477 | A | * | 7/1968 | Galbraith .............. | F41C 33/001 |
| | | | | | 248/118 |
| 4,345,398 | A | * | 8/1982 | Pickett .................... | F41A 23/06 |
| | | | | | 42/94 |
| 4,575,964 | A | * | 3/1986 | Griffin ................... | F16M 11/28 |
| | | | | | 42/94 |
| 5,018,294 | A | * | 5/1991 | McGuffee ............. | F41C 33/001 |
| | | | | | 42/94 |
| D327,525 | S | * | 6/1992 | Pena ............................ | D22/108 |
| 5,351,867 | A | * | 10/1994 | Vest .......................... | F41B 5/14 |
| | | | | | 224/916 |
| 5,738,256 | A | * | 4/1998 | Goff .......................... | A45F 5/00 |
| | | | | | 224/908 |
| 5,903,995 | A | * | 5/1999 | Brubach ................. | F41A 23/06 |
| | | | | | 42/90 |
| 5,913,668 | A | * | 6/1999 | Messer ................... | F41A 23/14 |
| | | | | | 42/94 |

(Continued)

*Primary Examiner* — Ingrid M Weinhold
(74) *Attorney, Agent, or Firm* — Karen Tang-Wai Sutton

(57) ABSTRACT

An assembly for use with a shooting stick comprising a forearm support with a wrist cuff and an arm cuff each with adjustable straps, a brace joining the cuffs, a holder formed under the arm cuff and a receiver formed under the wrist cuff. The receiver has a non-continuous wall with a gap sized and shaped to receive a body of the shooting stick when the stick is positioned under the brace and snapped into the holder and inside the gap. The receiver is formed with a first mating structure and an opening adapted to receive a second mating structure formed on either an upper end of the shooting stick or an adaptor coupled to the upper end of the shooting stick. Accessories including a universal adaptor, a belt hanger, and a leg coupler for adapting the shooting stick into a tripod are included.

17 Claims, 32 Drawing Sheets

(56) References Cited

U.S. PATENT DOCUMENTS

| | | | | |
|---|---|---|---|---|
| 5,988,466 | A * | 11/1999 | Brown | F41C 33/001 |
| | | | | 224/660 |
| 6,016,620 | A * | 1/2000 | Morgan | F41C 33/001 |
| | | | | 42/94 |
| 6,267,335 | B1 * | 7/2001 | Barrett | F41C 33/001 |
| | | | | 248/118 |
| 6,829,856 | B1 * | 12/2004 | Moorman | F41C 33/001 |
| | | | | D22/199 |
| 9,423,199 | B2 * | 8/2016 | Cuddeback | F41A 23/06 |
| 9,568,266 | B1 * | 2/2017 | LoRocco | F41A 23/06 |
| 9,841,659 | B2 * | 12/2017 | Tipson | A45F 5/021 |
| 2004/0211799 | A1 * | 10/2004 | Loughman | F16M 11/2021 |
| | | | | 224/628 |
| 2005/0029413 | A1 * | 2/2005 | Bryant | F41B 5/148 |
| | | | | 248/118 |
| 2008/0054130 | A1 * | 3/2008 | Castner | F41C 33/001 |
| | | | | 248/118 |
| 2016/0334189 | A1 * | 11/2016 | Steele | F41C 33/001 |

* cited by examiner

<u>FIG.4</u>

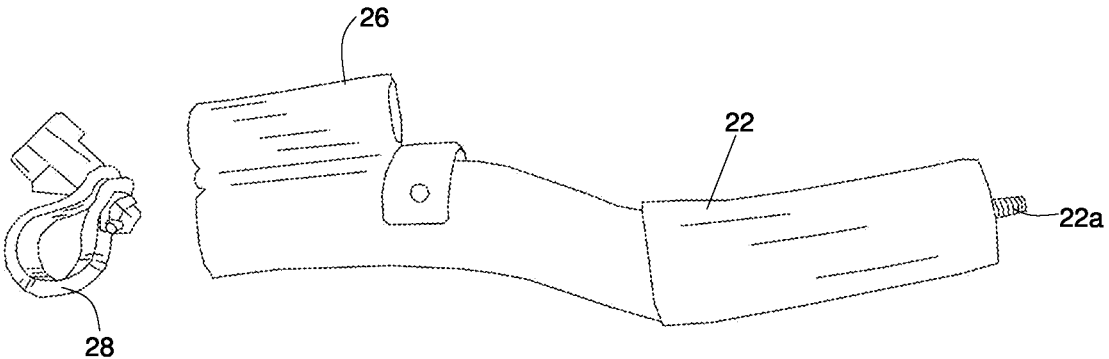
FIG.8

60

72

62

62

40

42

44

38

FOREARM SHOOTING STICK SUPPORT AND STORAGE ASSEMBLY

CROSS-REFERENCE TO RELATED APPLICATIONS

This application claims priority from U.S. provisional application Ser. No. 63/499,673 filed 2 May 2023, and U.S. provisional application Ser. No. 63/576,641 filed on 23 Feb. 2023, whose disclosures are hereby incorporated in their entirety by this reference.

STATEMENT REGARDING FEDERALLY SPONSORED RESEARCH OR DEVELOPMENT

NA

NAMES OF THE PARTIES TO A JOINT RESEARCH AGREEMENT

NA

INCORPORATION BY REFERENCE OF MATERIAL SUBMITTED ON A COMPACT DISC OR AS A TEXT FILE VIA THE EFS WEB SYSTEM

NA

STATEMENT REGARDING PRIOR DISCLOSURES BY THE INVENTOR OR A JOINT INVENTOR

NA

BACKGROUND OF THE INVENTION

Field of the Invention

The invention pertains to the field of arm support and stabilization devices, specifically, an arm support used with an existing shooting stick and other accessories to help stabilize and support an extended arm during activities requiring arm strength and steadiness such as in hunting and photography without sacrificing mobility and carrying convenience.

Background Art

Shooting sticks are used to help shooters support their firearms during game hunting or target practice. A shooting stick is a length-adjustable stick typically comprised of a ground contacting end and a threaded male upper end adapted to receive a Y shaped attachment used to support a rifle barrel of a firearm. Use of the shooting stick allows the shooter to reliably rest the firearm on the stick and maintain a stable height that would otherwise have to be achieved solely using the shooter's arm strength. Fatigue is a major issue during shooting activities; even young shooters have difficulty maintaining the position of their firearms for extended periods of time, and arm fatigue is a leading cause of missed shots. In some cases, the inability to stabilize the arm means people with limited arm strength are unable to continue to participate in shooting sports.

Similarly, photographers and videographers rely on tripods to maintain their camera or video recording equipment at a stable, steady height during use.

The problem with current shooting sticks and camera tripods is that they are designed for stationary use; after the location is chosen, the stick or tripod is adjusted and set up once, in a fixed location. To move the shooting stick or camera tripod, it must be adjusted back into a storage/transport position, typically by shortening the leg of the stick and collapsing the tripod legs together and shortening them. In this storage/transport position, the stick or tripod is carried by hand, in a shoulder case for the tripod, or in the case of the shooting stick, by a loop around the wrist. The adjusted stick or tripod is awkward to move otherwise, and it is aggravating to constantly adjust and readjust the stick and tripod when the current setup location must be changed. When hunting, this is particularly troublesome because the stick cannot be set up quickly or discreetly to take a shot. The hunter meanwhile is constantly adjusting the stick to a proper height and is forced to carry one more item at a time when multiple items are already being carried. The alternative is also awkward: hunters who adjust the stick once now have to devote one hand to holding the stick when moving around. The stick meanwhile has a tendency to get stuck in brush due to its length, making trekking through brush difficult. Worse, for bow hunters, shooting sticks cannot be used because there is no way to keep the stick secure while holding the bow.

In the case of a parent on the sidelines of a soccer game, priority is given to either stable video and photographs or mobility, but not both. Trying to move an adjusted tripod is such a nuisance, as is breaking down and resetting it, that the majority of parents simply hold their cameras and try to brace their arms to minimize blurry shots, prioritizing mobility over steady shots, and later using software to try to correct bad shots, with varying success. Few parents want to carry an extra tripod along with folding chairs, tables, umbrellas and the assortment of things commonly needed at outdoor events.

What is needed is an assembly for use with a shooting stick, bipod, or tripod that provides arm stability to a user without sacrificing mobility and convenience of use. What is also needed is an assembly for use with the shooting stick, bipod, or tripod providing the user a variety of optional support positions and attachment accessories, allowing the user hands free carrying and simplified one-time adjustment. What is finally needed is an assembly for a shooting stick that allows a shooting stick to be modified for use as a bipod or tripod, and can be adapted for use with a camera, firearm or bow using a variety of accessory components.

DISCLOSURE OF INVENTION

An assembly for use with a shooting stick having an upper end, a lower end, and a stick body between the upper end and the lower end, the assembly comprising a brace having an underside and an upper side, the upper side having first end with an arm cuff and a second end with a wrist cuff, and a receiver positioned on the underside below the wrist cuff. The receiver has a non-continuous wall with an upper wall end affixed to the wrist cuff and a lower wall end, the wall formed with a first mating structure. The lower wall end defines an opening and the non-continuous wall is further formed with a gap adapted to be used to receive the stick body. The opening is adapted to be used to receive either the upper end of the shooting stick or an adaptor coupled to the upper end of the shooting stick. A second mating structure adapted to pivotably couple with the first mating structure is formed into either the adaptor or the upper end of the shooting stick. In various embodiments, the first mating structure is disposed as an aperture and the second mating structure disposed as a hole for use with a fastener, or a push button telescoping tube lock adapted to mate with the aperture. There is a first adjustable strap attached to the arm cuff and a second adjustable strap attached to the wrist cuff. Finally, a holder attached to the underside of the brace below the arm cuff is disposed with an opening facing away from the underside adapted to receive the stick body. The assembly can be further comprised of the shooting stick in another embodiment.

In a first aspect of the invention, the brace is concave shaped.

In a second aspect of the invention, the assembly is further comprised of a removable fastener to be used with the first mating structure disposed as a pair of aligned apertures formed into the receiver and the second mating structure disposed as an aperture formed into either the adaptor or into the upper end of the shooting stick.

In a third aspect of the invention, the removable fastener is a clevis pin.

In a fourth aspect of the invention, the shooting stick is further comprised of a length telescopically adjustable from 24 to 58 inches.

In a fifth aspect of the invention, the adaptor is further comprised of a shooting stick receiving element adapted for use to couple to the shooting stick.

In a sixth aspect of the invention, the shooting stick is further formed with a threaded rod at its upper end, and the shooting stick receiving element of the adaptor is a threaded hole adapted for use to couple with the threaded rod of the shooting stick.

In a seventh aspect of the invention, the assembly further comprises a ground support having two or more feet in spaced apart relationship, and a hole adapted to receive the lower end of the shooting stick.

In an eighth aspect of the invention, a universal adaptor for use with the assembly comprises a stick sleeve having an interior space sized and shaped and adapted for use to rotatably house the stick body, the stick sleeve further having an exterior side, a clamp for use to adjustably clamp to the shooting stick below the stick sleeve and thus maintain a position of the shooting stick within the stick sleeve, a hand grip having a grip upper end, the hand grip affixed to the exterior side of the stick sleeve, and a handle threaded coupler formed into the grip upper end.

In a ninth aspect of the invention, the universal adaptor is adapted for use to couple to a yoke accessory or to a camera holding accessory, with the handle threaded coupler having a ¼-20 thread size.

In a tenth aspect of the invention, a belt hanger for use with the assembly comprises a body having a belt end formed with a hook and an opposed stick end formed with a lower stick receiver disposed as a cup adapted for use to receive the lower end of the shooting stick and an adjustable strap attached to the stick end.

In an eleventh aspect of the invention, a leg coupler for use with the assembly and for use with a leg, comprises a stick clamp adapted for use to receive the stick body and a leg clamp adapted to receive the leg, whereby the shooting stick is converted for use as a bipod.

In a twelfth aspect of the invention, an accessory kit for use with the universal adaptor comprises an adjustable length leg, a leg coupler having a stick clamp adapted for use with the shooting stick and a leg clamp adapted for use to clamp to the leg, and a clip adapted for use to receive the adjustable length leg and adapted for receiving the body of the shooting stick.

BRIEF DESCRIPTION OF THE DRAWINGS

FIG. 8 is a perspective view of a universal stick adaptor assembly according to the invention.

5

Figure 23:
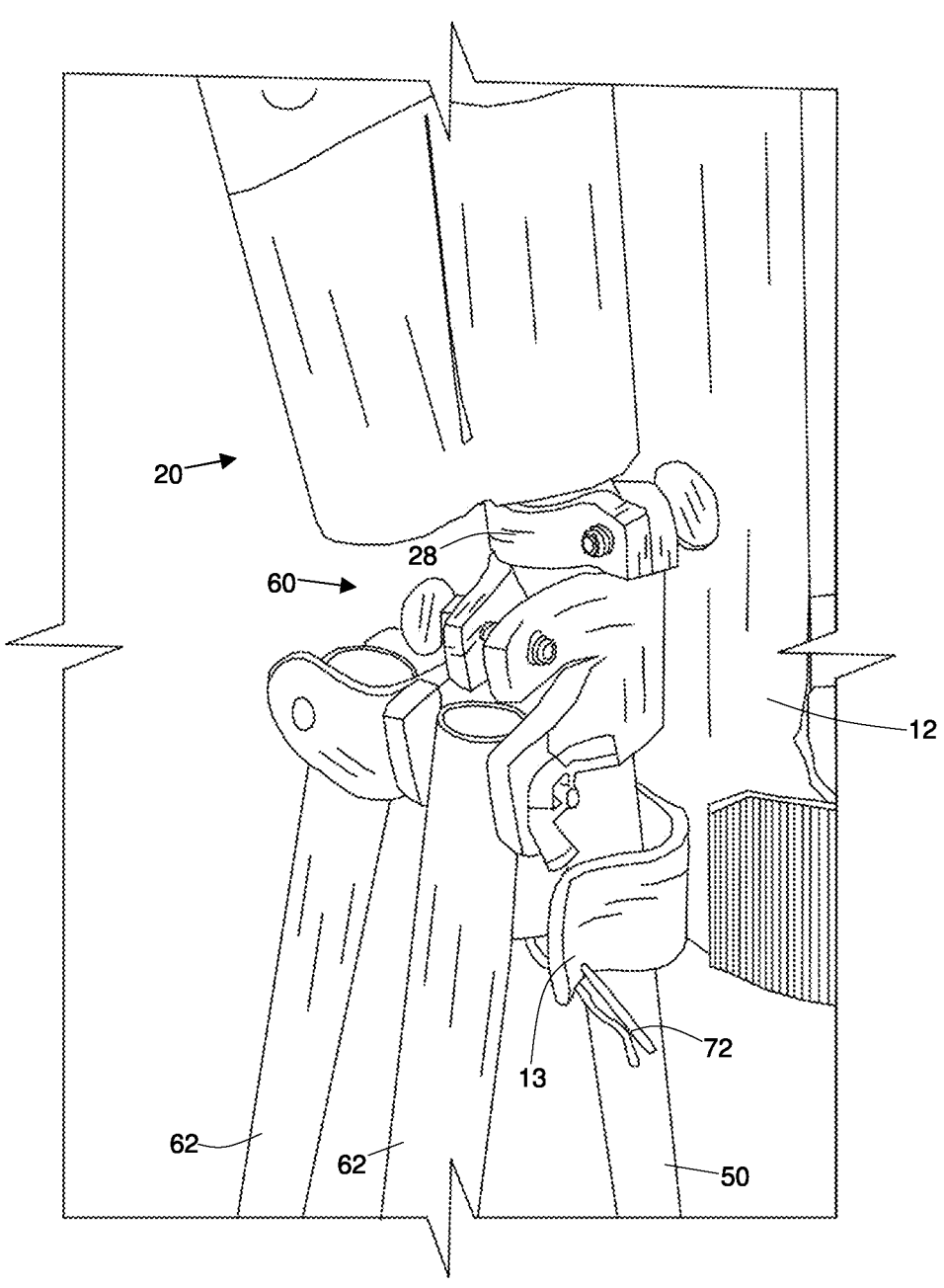

FIG. 23 is a detail view of the leg coupler attached to a pair of legs and to the shooting stick coupled to the universal adaptor assembly.

Figure 24:
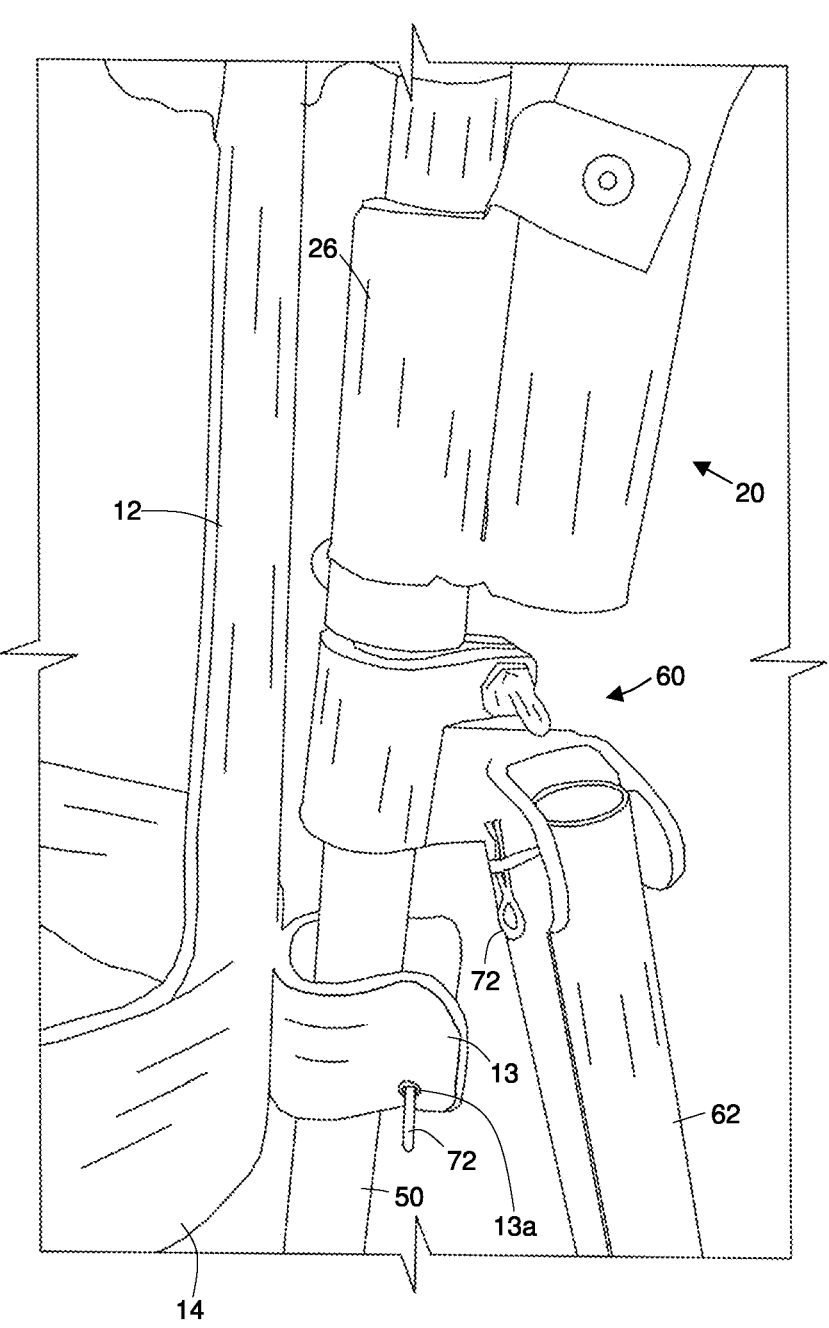

FIG. 24 is a second detail view of the leg coupler attached to the shooting stick that is coupled to the universal adaptor assembly.

Figure 25:
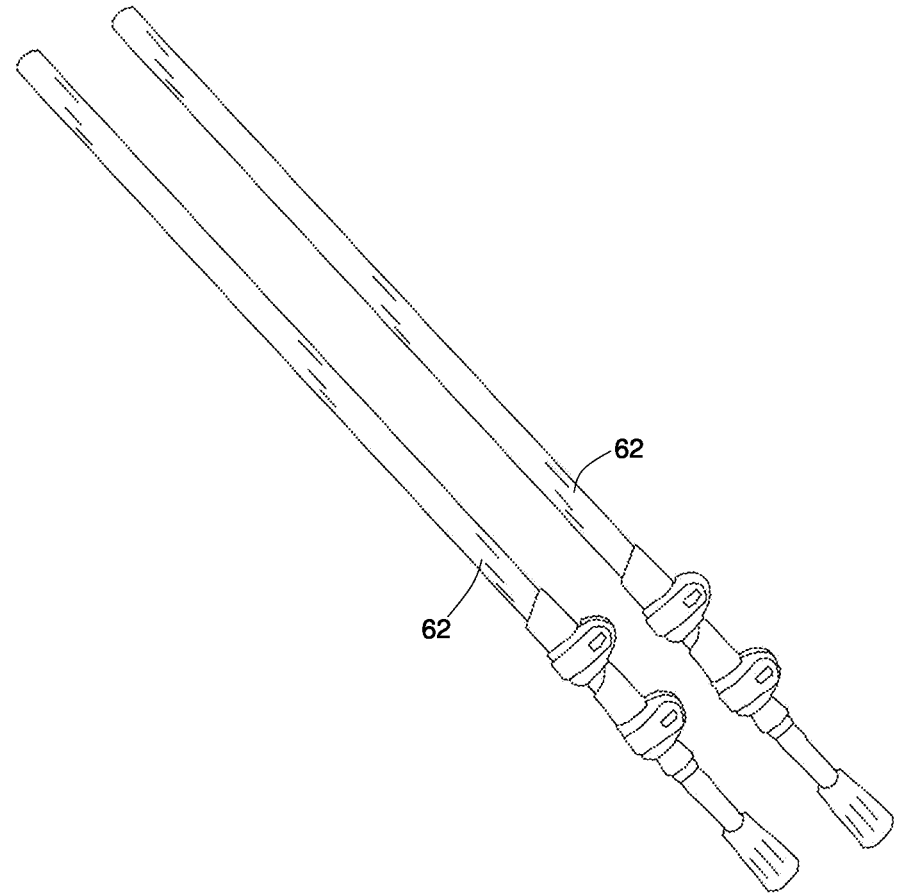

FIG. 25 is a perspective view of a representative embodiment of legs suitable for use with the forearm support and universal adaptor assembly.

Figure 26:
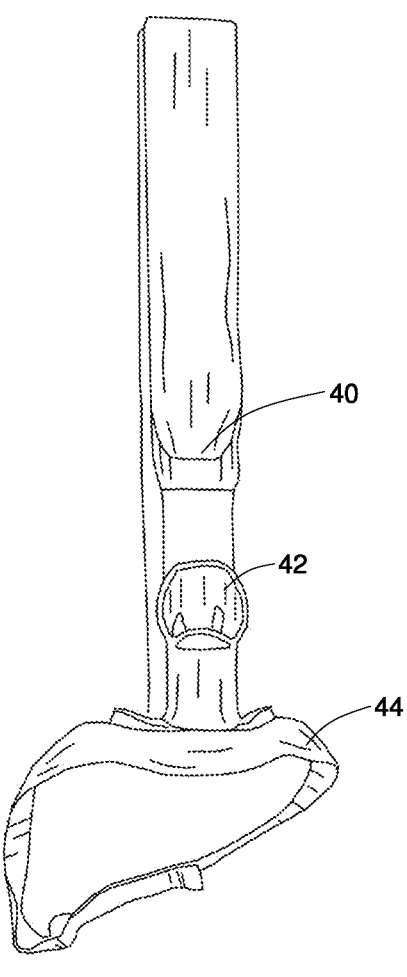

FIG. 26 is a front view of a belt hanger for use with the shooting stick according to the invention.

Figure 27:
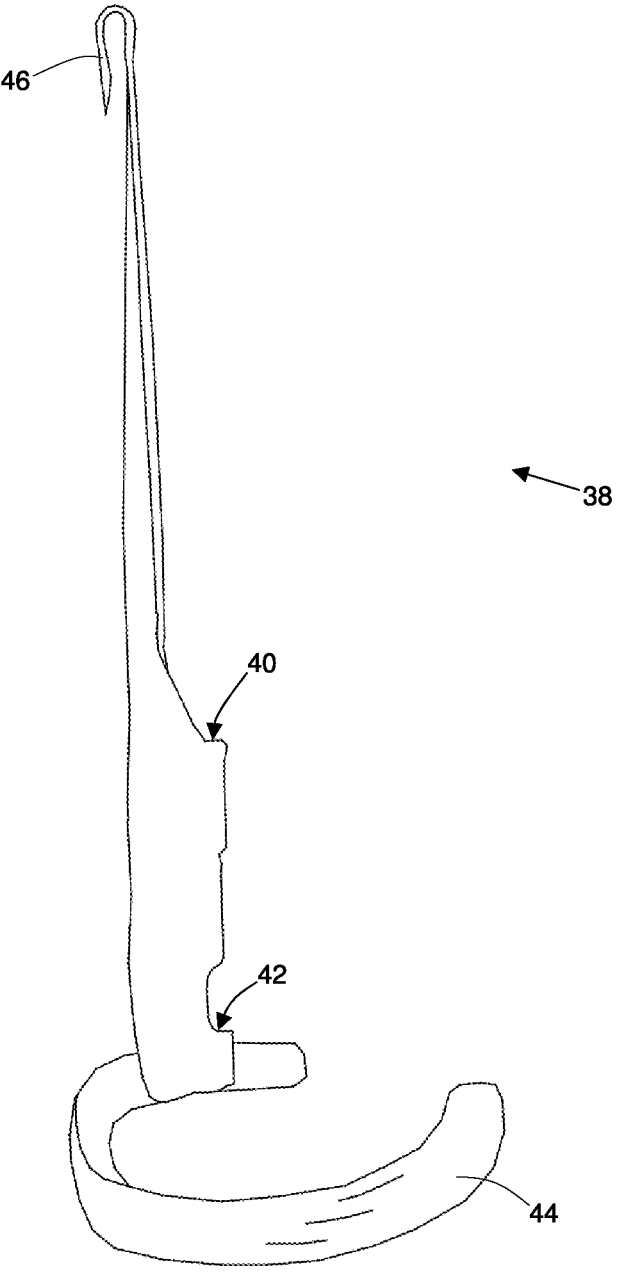

FIG. 27 is a side view of the belt hanger in FIG. 26.

Figure 28:
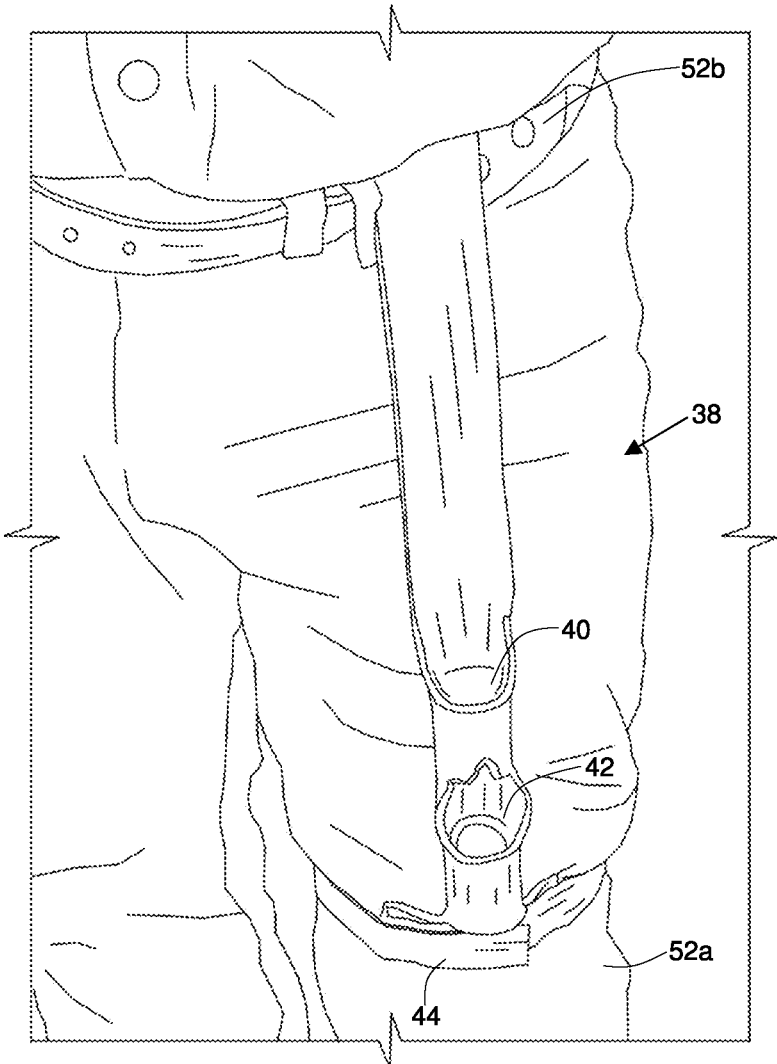

FIG. 28 is a front view of the belt hanger in FIGS. 26 and 27, shown worn by the user.

Figure 29:
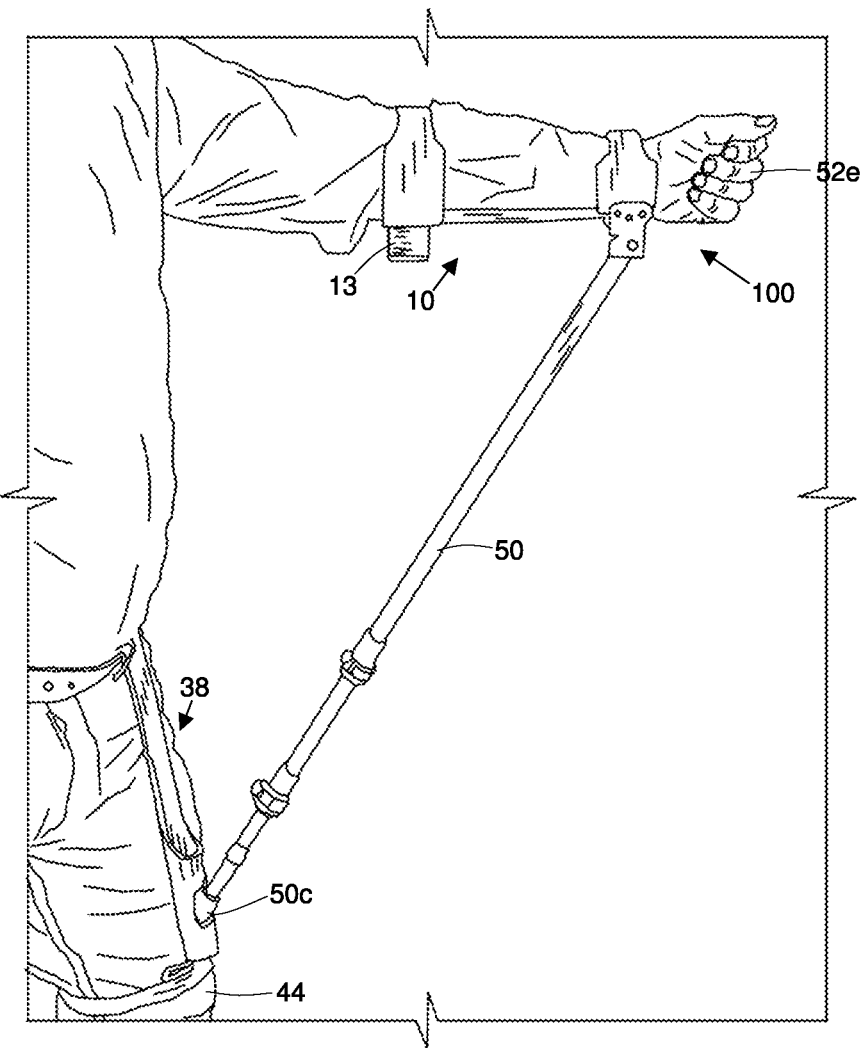

FIG. 29 is a perspective view of the user in FIG. 28, shown with the user wearing the forearm support coupled to the stick and with a stick lowermost end inserted into the leg holder.

Figure 30:
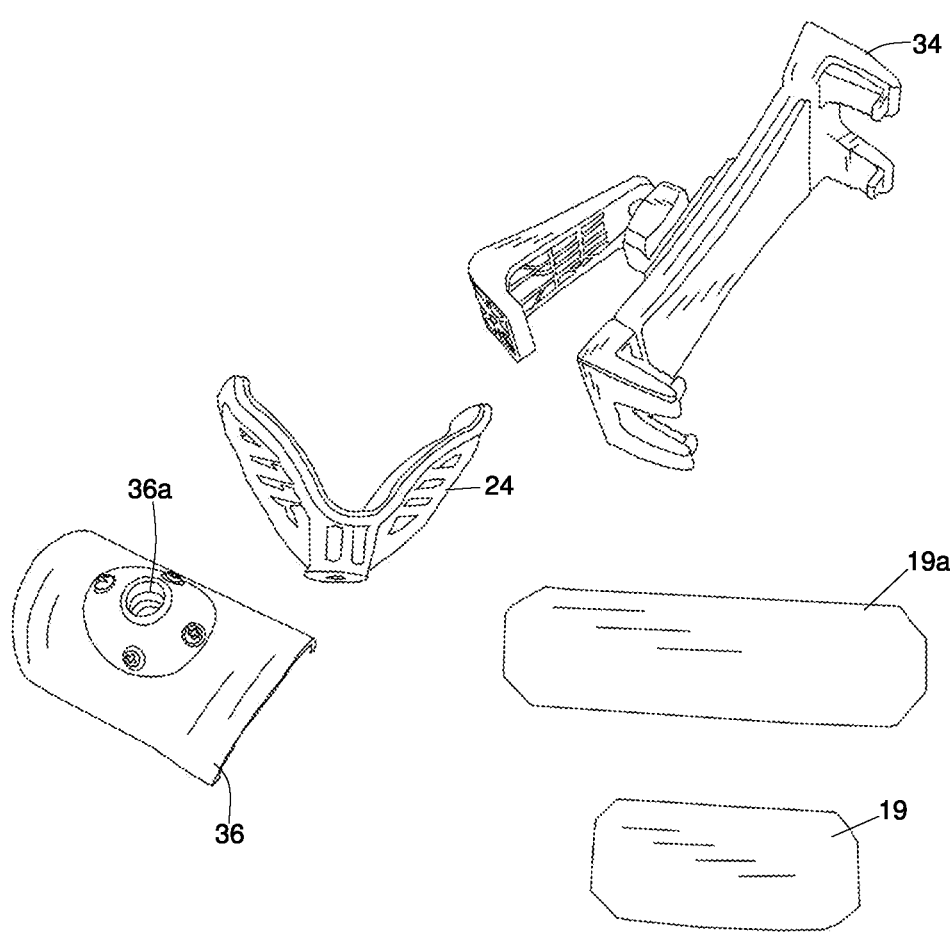

FIG. 30 is a perspective view of accessories for use with the forearm support and shooting stick.

Figure 31:
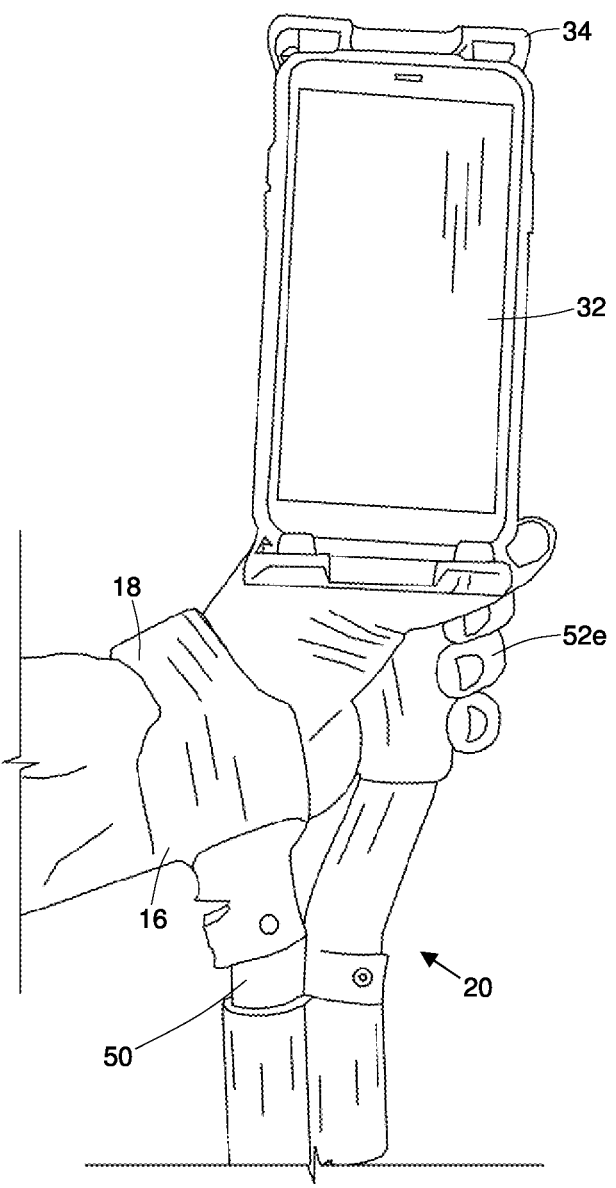

FIG. 31 is a perspective view of a phone holder accessory coupled to the universal adaptor assembly.

Figure 32:
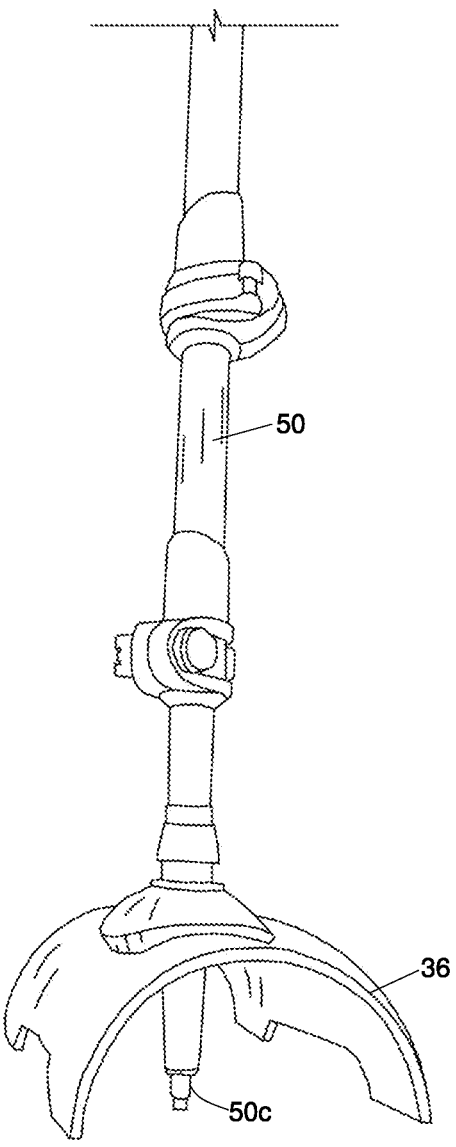

FIG. 32 is a foot stabilizer shown coupled to the lowermost end of the stick.

DRAWINGS LIST OF REFERENCE NUMERALS

The following is a list of reference labels used in the drawings to label components of different embodiments of the invention, and the names of the indicated components:

100 forearm shooting stick support assembly
10 forearm support
12 brace
13 holder
14 arm cuff
15 receiver (either for mating with shooting stick upper end or pivoting adaptor)
15a receiver aperture or aperture
15b second fastener
15c gap in receiver wall
15d receiver fastener
16 wrist cuff
18 strap
19 first brace size reducer
19a second brace size reducer
20 universal adaptor
22 hand grip
22a handle threaded coupler
24 yoke firearm support (Y-shaped)
26 stick sleeve (allows the stick to swivel within)
28 clamp
30 pivoting adaptor
30a adaptor aperture or pin receiver
30b threaded hole or threaded receiver
32 mobile device with a camera
34 mobile device mount or camera mount
36 ground support
37 36a central hole of floor stand
38 belt hanger
40 upper stick receiver
42 lower stick receiver
44 hanger strap
46 hook
50 shooting stick or stick
50a threaded rod
50b stick aperture
50c lowermost end of stick

6

52 user
52a user's leg
52b user's belt or waist
52c user's forearm
52d user's wrist
52e user's hand
54 firearm
56 bow
58 upper end of shooting stick
60 leg coupler
62 leg
64 leg strap
66 clip
68 poly cord
70 retaining ring for poly cord
72 fastener (cotter pin, clevis pin)

DETAILED DESCRIPTION

Figure 1:
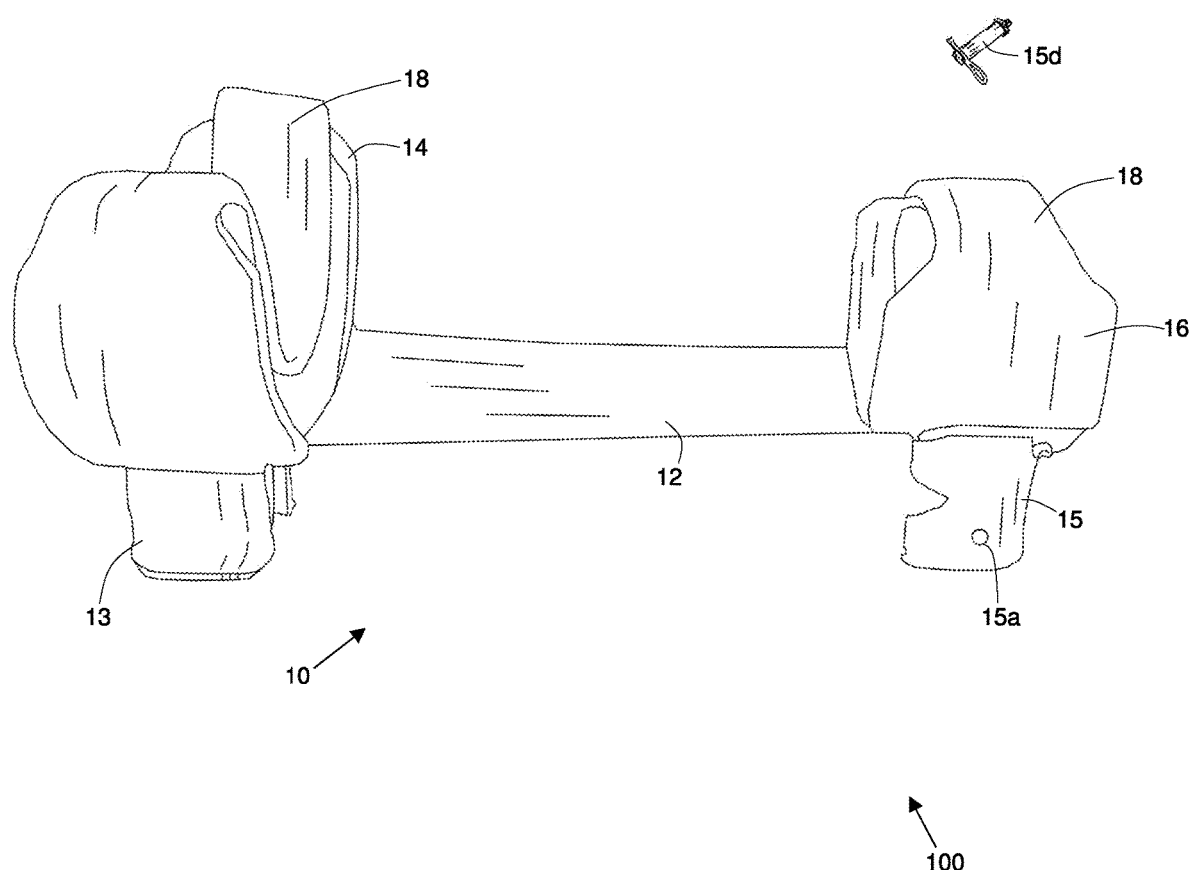
FIG. 1 is a perspective view of a forearm support according to the invention.

A forearm shooting stick support assembly according to the invention or assembly 100 is shown in the FIG. 1 in its most simple embodiment as a forearm support 10 having a receiver 15 formed with first mating structure, shown in the representative embodiment in the FIGS. as a receiver aperture or aperture 15a adapted to mate with a receiver fastener 15d. The receiver fastener 15d in the representative embodiment is a clevis pin with a second fastener 15b shown as a cotter pin, however any removable fastener that can securely mate with the aperture 15a can be used as the receiver fastener 15d. The assembly 100 can be pivotably coupled directly to a second mating structure, in the representative embodiment shown as a stick aperture 50b formed at an upper end of the shooting stick 50, using the receiver fastener 15d, as shown for instance in FIGS. 6-7, or alternatively, the shooting stick 50 is coupled to one of two optional shooting stick adaptors, a pivoting adaptor 30 shown in FIGS. 3 and 4, or to a universal adaptor 20 shown in FIGS. 8-13.

The FIGS. 1-32 show the assembly 100 as used with the shooting stick 50, or with the shooting stick 50 plus either or both the pivoting adaptor 30 and the universal adaptor 20, along with a plurality of different accessories that can be used with the assembly 100, the shooting stick 50, and the adaptors 30 2050, illustrating a variety of ways the assembly 100 and the adaptors 30 2050 can be used in both hunting and photography settings, either supported by a ground surface or by a user's leg 52a, providing reliable, steady support for a firearm 54, bow 56, or camera 32 of a mobile device. The FIGS. thus provide examples of the flexibility of use of the assembly 100, adaptors 20 30, and accessories, when used with the shooting stick 50.

Figure 2:
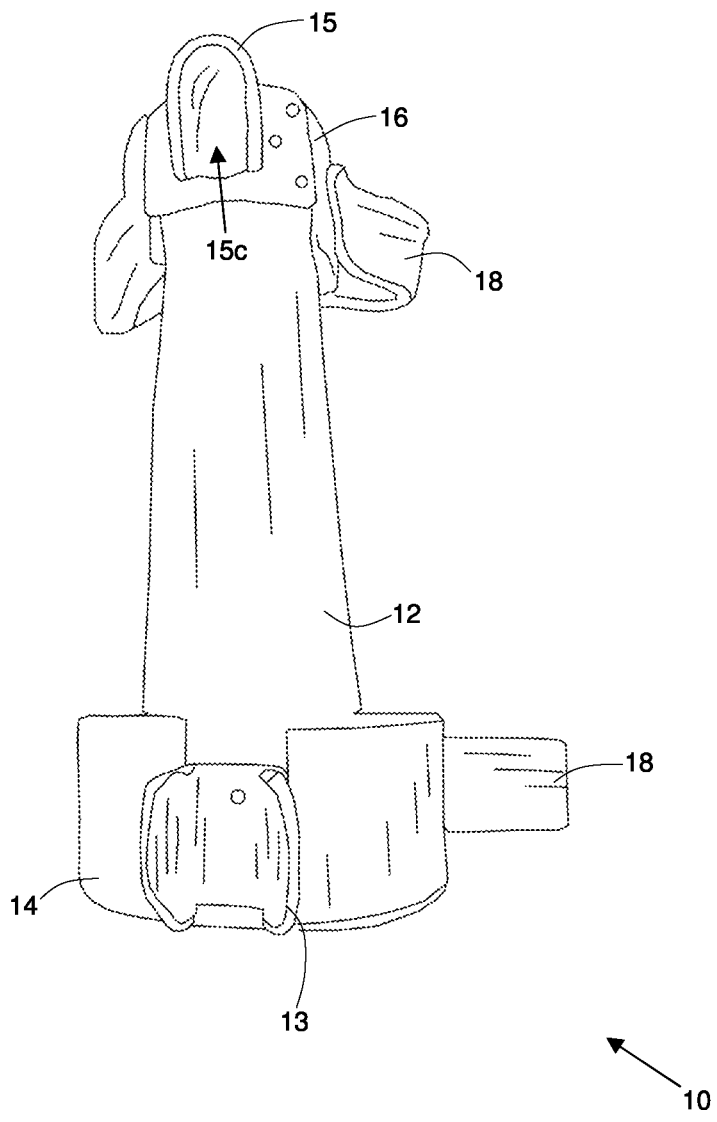
FIG. 2 is a bottom elevation view of the forearm support in FIG. 1.

Turning to FIGS. 1 and 2, the assembly 100 in the representative embodiment has a concave brace 12 portion sized and shaped to fit a forearm 52c of a user 52, and a pair of arm cuffs 14 16 on opposed ends of the brace 12, with an arm cuff 14 positioned at an elbow end of the brace 12 and a wrist cuff 16 positioned at a wrist end of the brace 12 and at the user's wrist 52d. Hook and loop or other adjustable fastening straps 18 attached to the cuffs 14 16 allow the user 52 to secure the forearm support 10 to the user's forearm 52c. It is notable that the straps 18 are tightened enough to prevent slippage of the forearm support 10 but also allow free wrist 52d movement. The concave shape of the brace 12 helps keep the forearm support 10 in a proper use position by cupping the user's forearm 52c. Optional arm support reducer pads 19 19a shown in FIG. 30 may be used between the brace 12 and the user's forearm 52c to adjust the forearm support 10 for comfort or fit as needed, particularly for users with smaller forearms, such as women or children.

A holder 13 is formed on an underside of the arm cuff 14 and is sized and shaped to receive the shooting stick 50. The holder 13 typically is a c-shaped flexible element into which the shooting stick 50 is pressure fitted to lock the shooting stick 50 to the brace 12. To remove the shooting stick 50, force is again applied to the shooting stick 50 to flex the holder 13 and disengage the stick 50. Optionally, a brace aperture 13a (shown in FIG. 24) is formed into the holder 13 and the inserted shooting stick 50 is further secured by a fastener 72, shown in the representative embodiment as a cotter pin. Other methods of securing and releasing the shooting stick 50 from the assembly 100 can include a variety of known coupling structures, including hook and loop, snap or button couplers, sliding or twisting couplers, etc. and hence the holder 13 shown in the FIGS. is a representative embodiment only and is not meant to limit the invention to only the structures shown in the FIGS.

The receiver 15 is formed on an underside of the wrist cuff 16. The receiver 15 has partial cylindrical wall with a gap 15c in the wall oriented such that when the receiver 15 engages an upper end 58 of the shooting stick 50, as shown in FIG. 5, or engages the pivoting adaptor 30, as shown in FIG. 4, and the shooting stick 50 is pivoted into a storage position by snapping into the holder 13, the shooting stick 50 moves into the gap 15c as the stick 50 is locked into the holder 13.

The receiver 15 allows the inserted upper end 58 of the shooting stick 50 a pivotable range of motion of up to 90 degrees. In the embodiment shown for instance in FIG. 7, the first mating structure is shown as the aperture 15a of the receiver 15 and configured as a pair of opposed and aligned holes and sized and shaped to receive the receiver fastener 15d, or a second fastener 15b, configured in the embodiments as the clevis pin and cotter pin. Again, the inventor notes that any other type of fastener can be used so long as it allows the shooting stick 50 to pivot, thus safety pins, clevis pins, and even dowels are suitable fasteners useable as a second fastener 15b or receiver fastener 15d when the first mating structure is an aperture. The inventor notes that instead of the apertures 15a and the receiver fastener 15d, the receiver 15 can instead be configured with the first mating structure pivotably mating with a second mating structure on the upper end 58 of the shooting stick or on the pivoting adaptor 30 where the first mating structure is disposed as a pair of convex bumps that pressure mate with the second mating structure disposed as a pair of concave depressions formed into the pivoting adaptor 30 or in the upper end 58 of the shooting stick, or vice versa. Other embodiments of the second mating structure include partial holes formed into the pivoting adaptor 30 or the upper end of the shooting stick for use with one or more fasteners that insert into each receiver aperture 15a and into the pivoting adaptor or shooting stick partial holes. Another useful embodiment of first and second mating structures for the receiver and either the upper end 58 of the shooting stick or the pivoting adaptor 30 is for the first mating structure to be disposed as the aperture 15a and the second mating structure on either the upper end 58 of the shooting stick or on the pivoting adaptor 30 disposed as one or more push button assemblies commonly referred to as telescoping tube locks that are formed with a spring body and a protruding button, such as the ones sold by Alcobra Metals of 4510 North Freya, Spokane, Washington 99217 or a variety of other appropriately sized and shaped push button assemblies used with telescoping tube locks provided for sale by a variety of different companies. When the pivoting adaptor 30 or the upper end 58 of the shooting stick is pushed into the receiver 15, the push button assembly (second mating structure) mates with the aperture 15a of the receiver 15 (first mating structure). Hence, the embodiment shown in the FIGS. is meant to be illustrative of one useful embodiment only, using a single fastener 15d here shown as a clevis pin, but is not meant to limit the pivotable coupling of the pivoting adaptor 30 to the receiver 15 to just the structures shown, or to imply that the fastener 15d is required with the first and second mating structures. The inventor stresses that the embodiments shown in the FIGS. are thus illustrative only and are not meant to limit his invention to just the embodiment shown.

Figure 5:
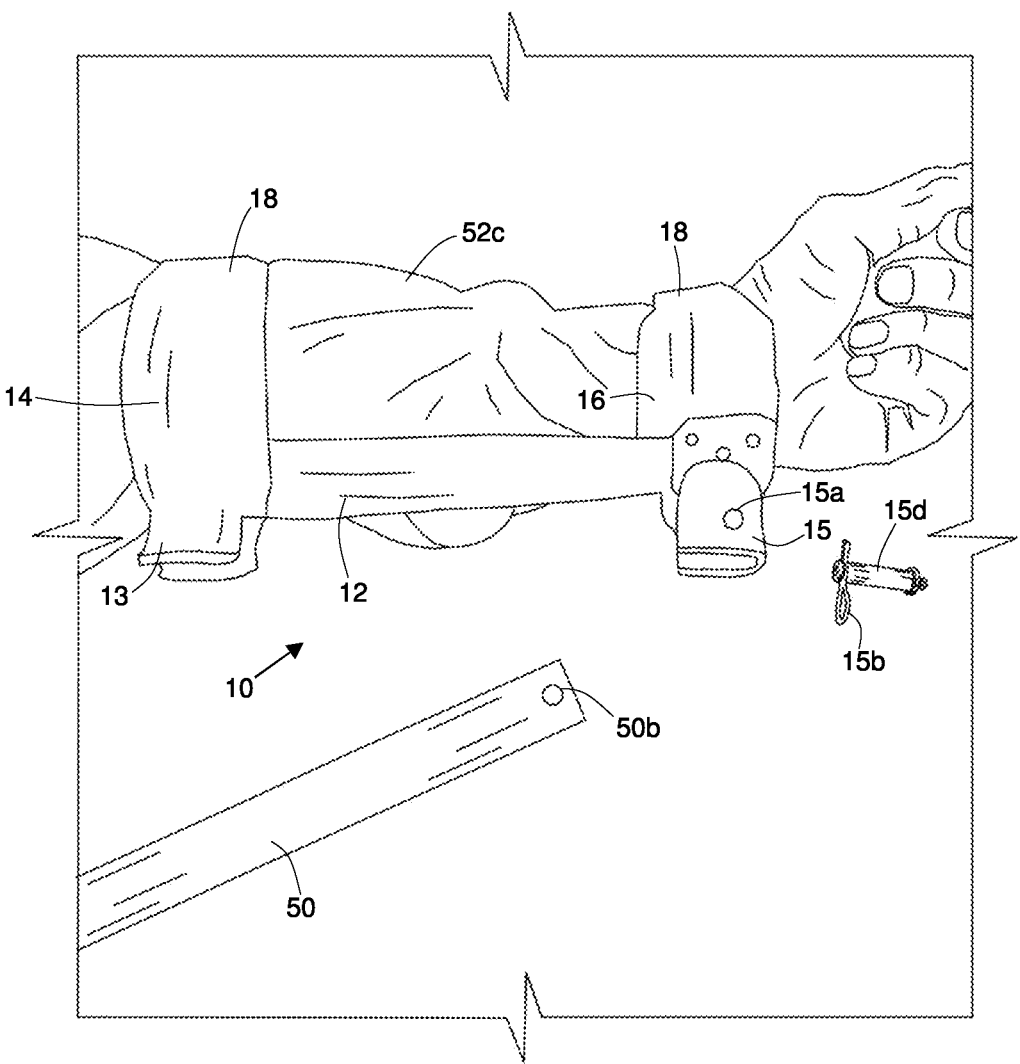
FIG. 5 is a perspective view of the forearm support worn by the user shown ready to receive the shooting stick disposed with a stick hole at its upper end sized and shaped to couple with the forearm support.
Figure 7:
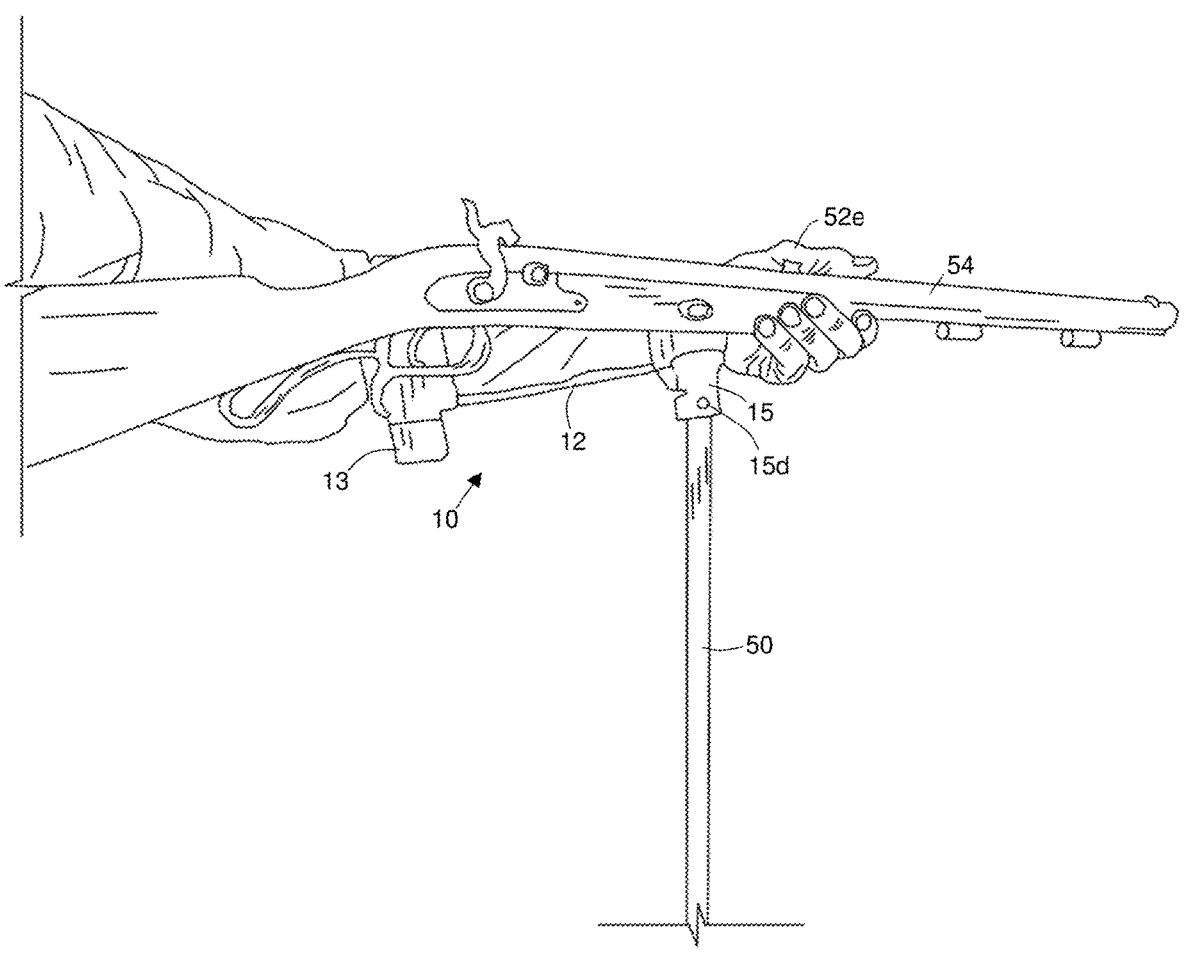
FIG. 7 is a perspective view of the user in FIG. 5, shown holding a rifle.
Figure 9:
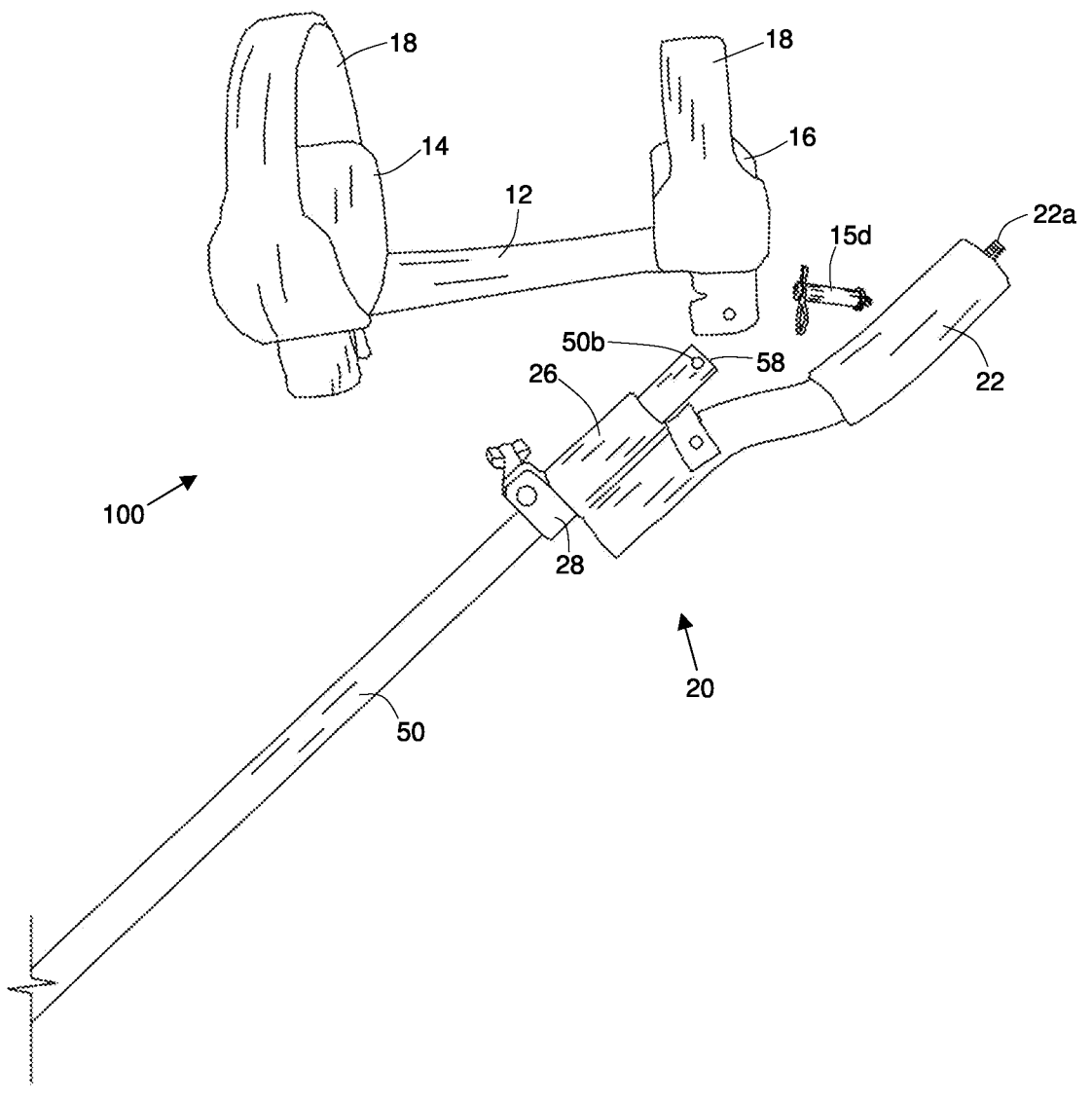
FIG. 9 is a perspective view of the universal stick adaptor assembly in FIG. 8, shown attached to the shooting stick shown in FIG. 5, and in a ready to use position with the forearm support.
Figure 10:
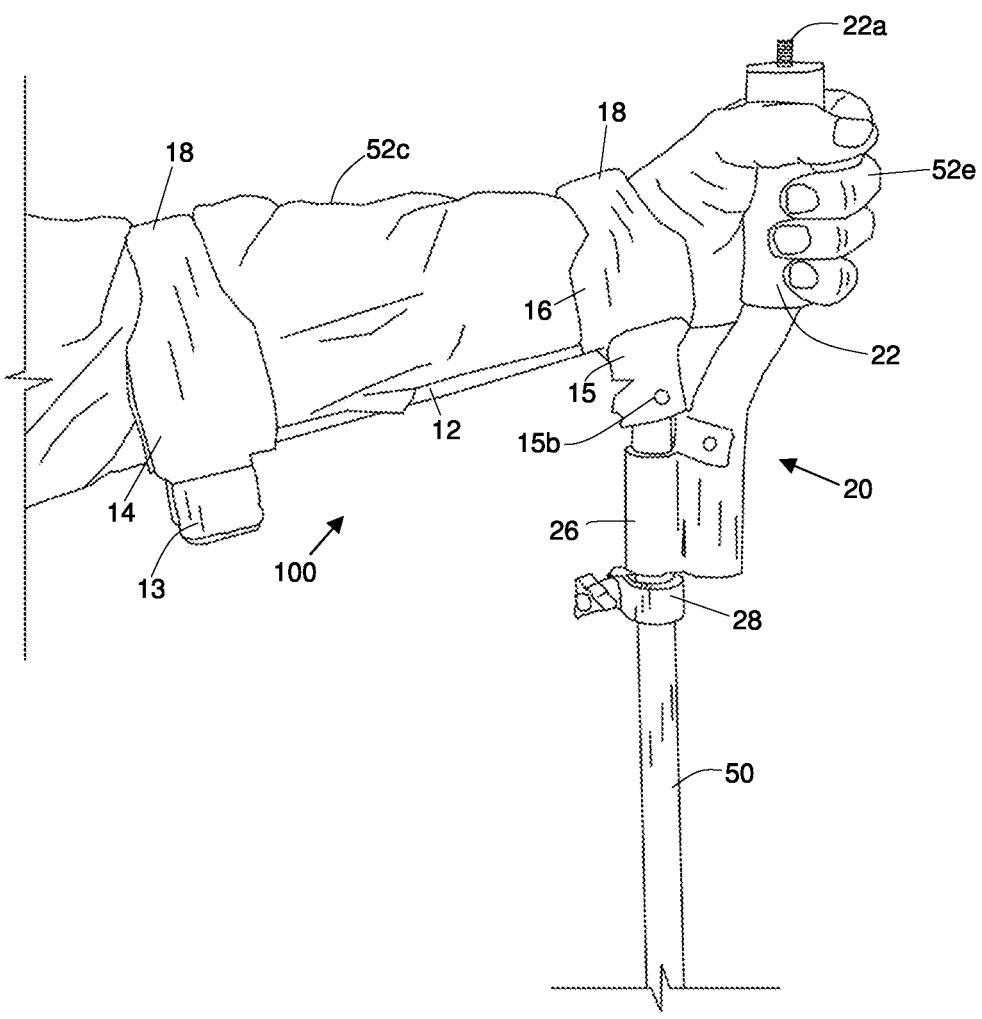
FIG. 10 is a perspective view of the universal stick adaptor assembly in FIG. 9, shown worn by the user and in a ready to use position.

The inventor notes that the shooting stick 50 shown in FIGS. 5 and 7 having a stick aperture 50b at its upper end is a proprietary shooting stick designed specifically for use with the assembly 100 as well as with the universal adaptor 20 and is not a prior art shooting stick, the stick aperture 50b again being an embodiment of the second mating structure. If the concave-convex mating structures are used, instead of a stick aperture 50b, the second mating structure is a concave or convex structure that mates with the corresponding first mating structure of the receiver 15. The stick 50 fully extended is approximately 58 inches long, with its length telescopically adjustable to 24 inches for use with the belt hanger 38. The inventor notes however that the stick 50 can be any length that is useful to the user 52, including shorter or longer lengths to accommodate different user heights.

Figure 3:
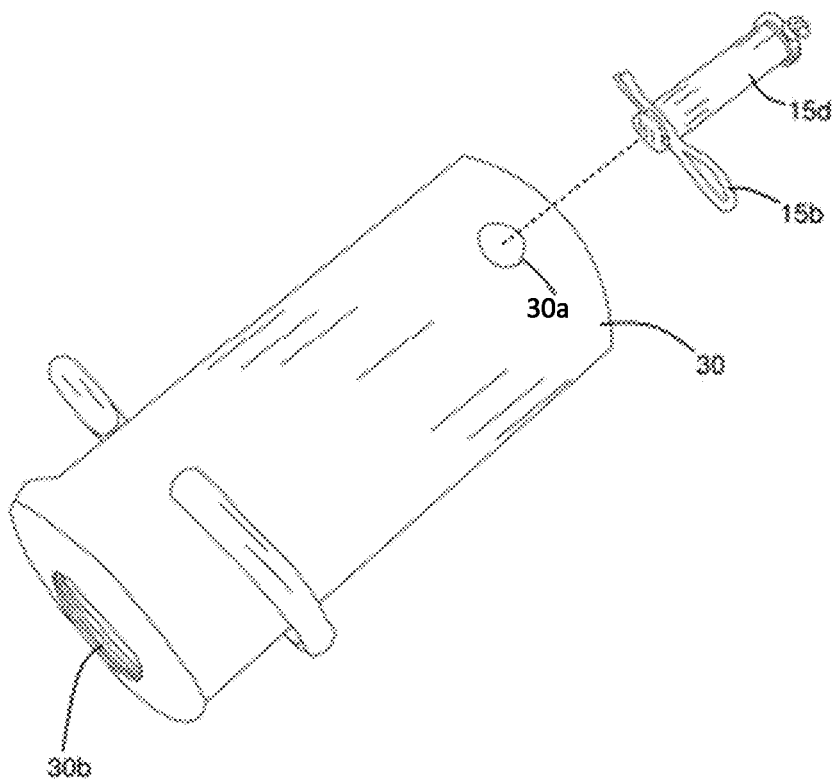
FIG. 3 is a perspective view of a pivoting adaptor for use with the forearm support according to the invention.
Figure 4:
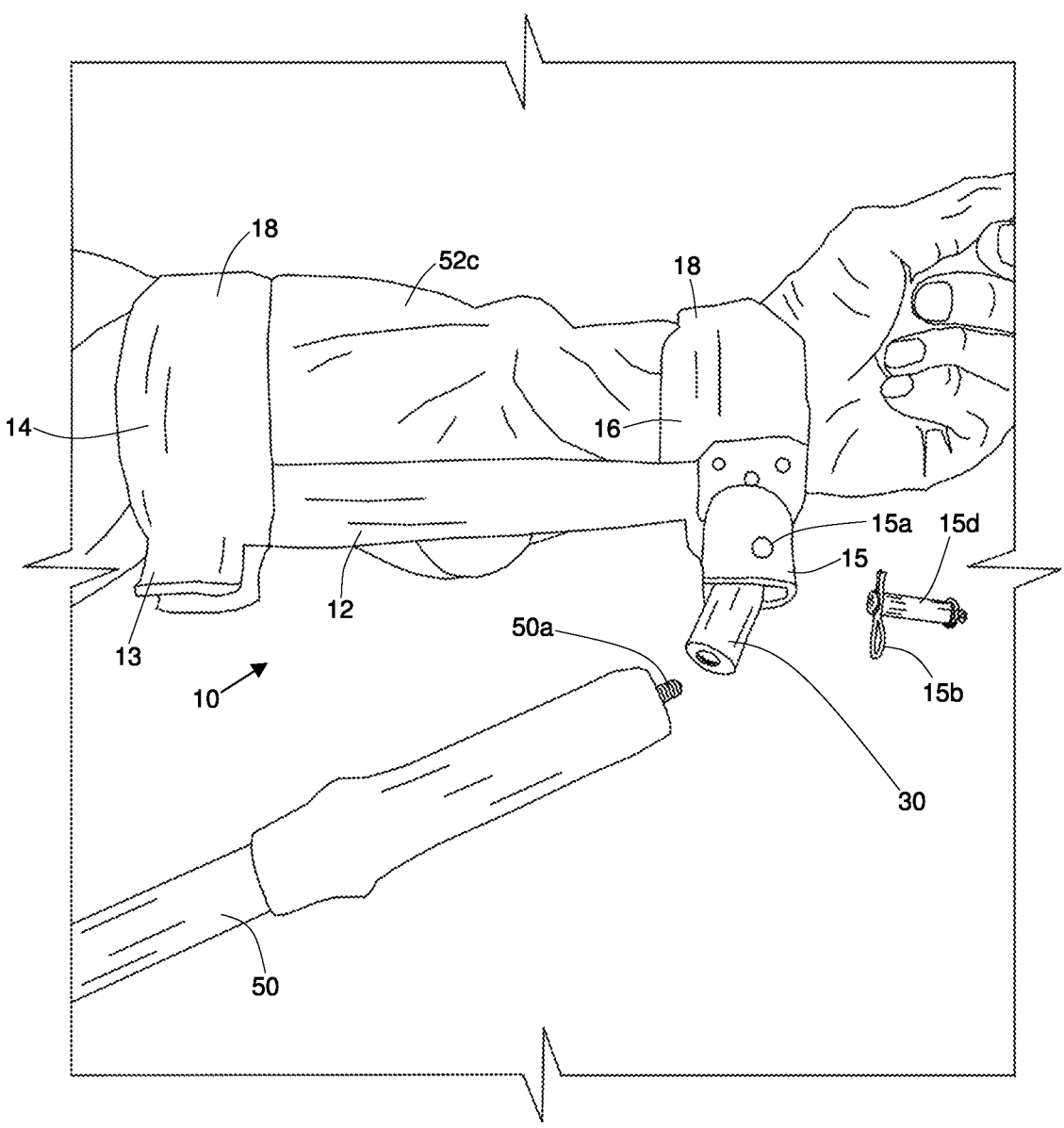
FIG. 4 is a perspective view of the pivoting adaptor in FIG. 3, shown attached to the forearm support and worn by a user and ready to receive a shooting stick having a threaded rod at its uppermost end.

Turning to FIGS. 3-4, in the representative embodiment, the pivoting adaptor 30, formed with an adaptor aperture or pin receiver 30a, is configured as a through-hole in the body of the pivoting adaptor 30. A female threaded coupler or threaded hole or threaded receiver 30b is formed at a lower end of the pivoting adaptor 30, sized and shaped to receive a male threaded rod coupler or threaded rod 50a of the shooting stick 50. The pivoting adaptor 30 is used when the user 52 wants to use a shooting stick 50 embodiment formed with a threaded rod 50a at its upper end 58, with the assembly 100. The inventor notes that there are many types of shooting sticks and the upper end 58 of the shooting stick 50 can differ by stick manufacturer, hence the need for adaptors 30 20 to allow all shooting stick 50 types to be used successfully with the assembly 100. Prior art shooting sticks typically have the threaded rod 50a to allow a removable yoke 24, camera mount 34 or other accessory to be attached thereto.

When the threaded rod 50a is mated with the threaded receiver 30b of the pivoting adaptor 30, and the pivoting adaptor 30 is coupled to the receiver 15, the pivoting adaptor 30 has a 90 degree range of motion, ranging from perpendicular to the brace 12 when the stick 50 is supported by a ground surface in a use position, to rotated so as to be parallel with the brace 12 and snapped into the holder 13 in a storage or travel position.

The universal adaptor 20, shown in FIGS. 8-13 has a stick sleeve 26 sized and shaped to receive the upper end 58 of the shooting stick 50, a hand grip 22 terminating in a handle threaded coupler 22a and a clamp 28 adjustably positioned onto the shooting stick 50 below the stick sleeve 26 to secure the position of the universal adaptor 20 on the shooting stick 50 and allow the user 52 to determine a comfortable height for the hand grip 22. A handle threaded coupler 22a on an uppermost end of the hand grip 22 has a standard coarse thread size of ¼-20 SAE (Society of Automotive Engineers standard coarse), a commonly used thread size for accessories, and allows a variety of accessories, (such as the yoke 24 shown in FIG. 11) to be coupled to the universal adaptor 20. Threaded size adaptors can also be used in the case of incompatibility with existing threaded couplers 22a and threaded rods 50a.

The inventor notes that the stick sleeve 26 allows the universal adaptor 20 to rotate freely around the shooting stick 50 coupled to the receiver 15 of the assembly 100. The shooting stick 50 shown in FIGS. 8-13 is formed with the stick aperture 50b, to permit immediate coupling with the receiver 15, however if the shooting stick has the threaded rod 50a, the threaded rod 50a would first be coupled to the pivoting adaptor 30 and then the pivoting adaptor 30 coupled to the receiver 15. Thus, both adaptors 20 30 can be used together with the shooting stick 50 depending on the characteristics of the stick 50.

The FIGS. show a variety of different ways the assembly 100 and different adaptors 30 20 and accessories can be used with mobile device cameras 32, firearms 54 and bows 56.

Figure 14:
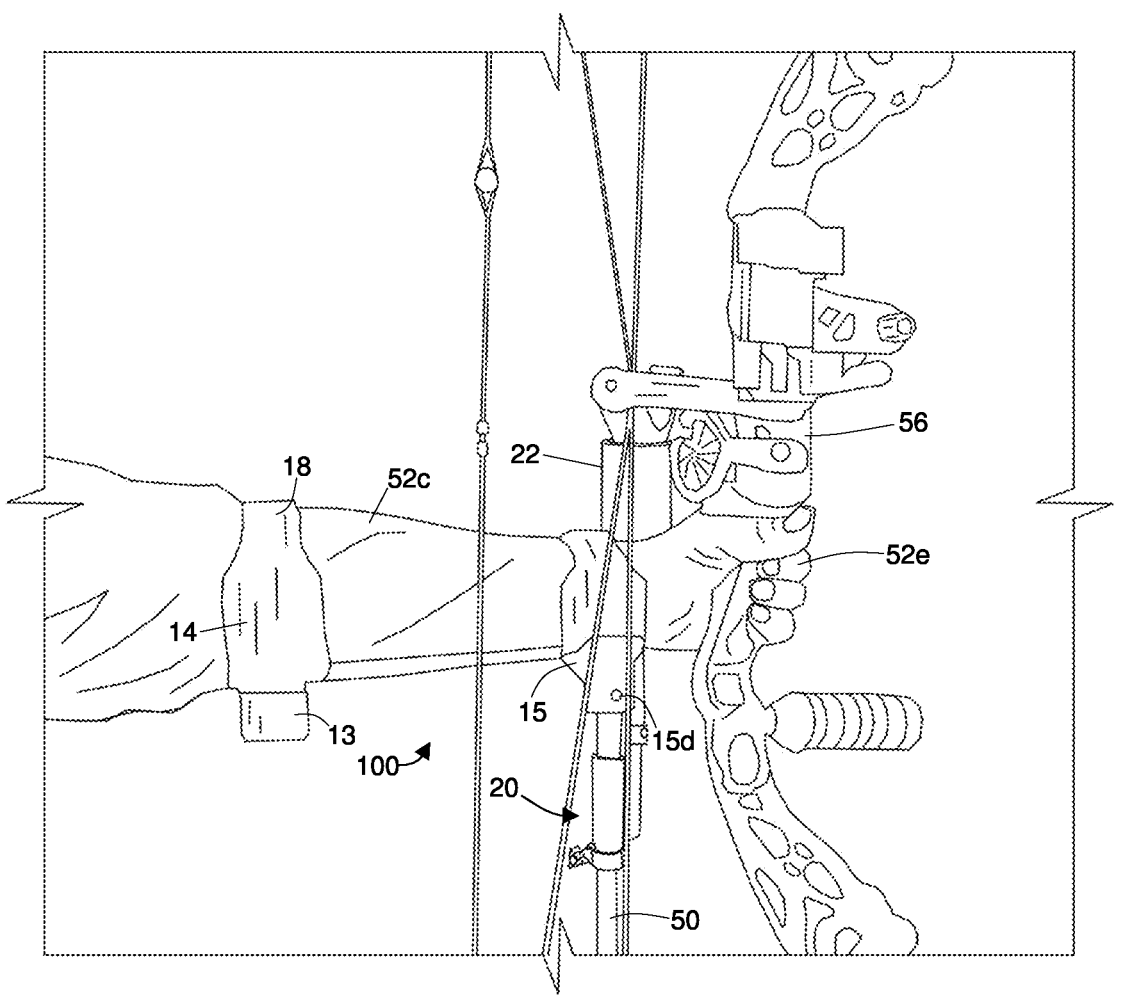
FIG. 14 is a perspective view of the forearm support and stick in FIG. 5, shown worn by the user holding a bow.

For instance, when the assembly 100 is used with or without the pivoting adaptor 30 and the shooting stick 50, the user 52 holds the firearm 54, bow 56 or mobile device camera 32 in the user's hand 52e, with the shooting stick 50 extended so as to perpendicular to the brace 12, as shown for instance in FIGS. 7 and 14.

Figure 11:
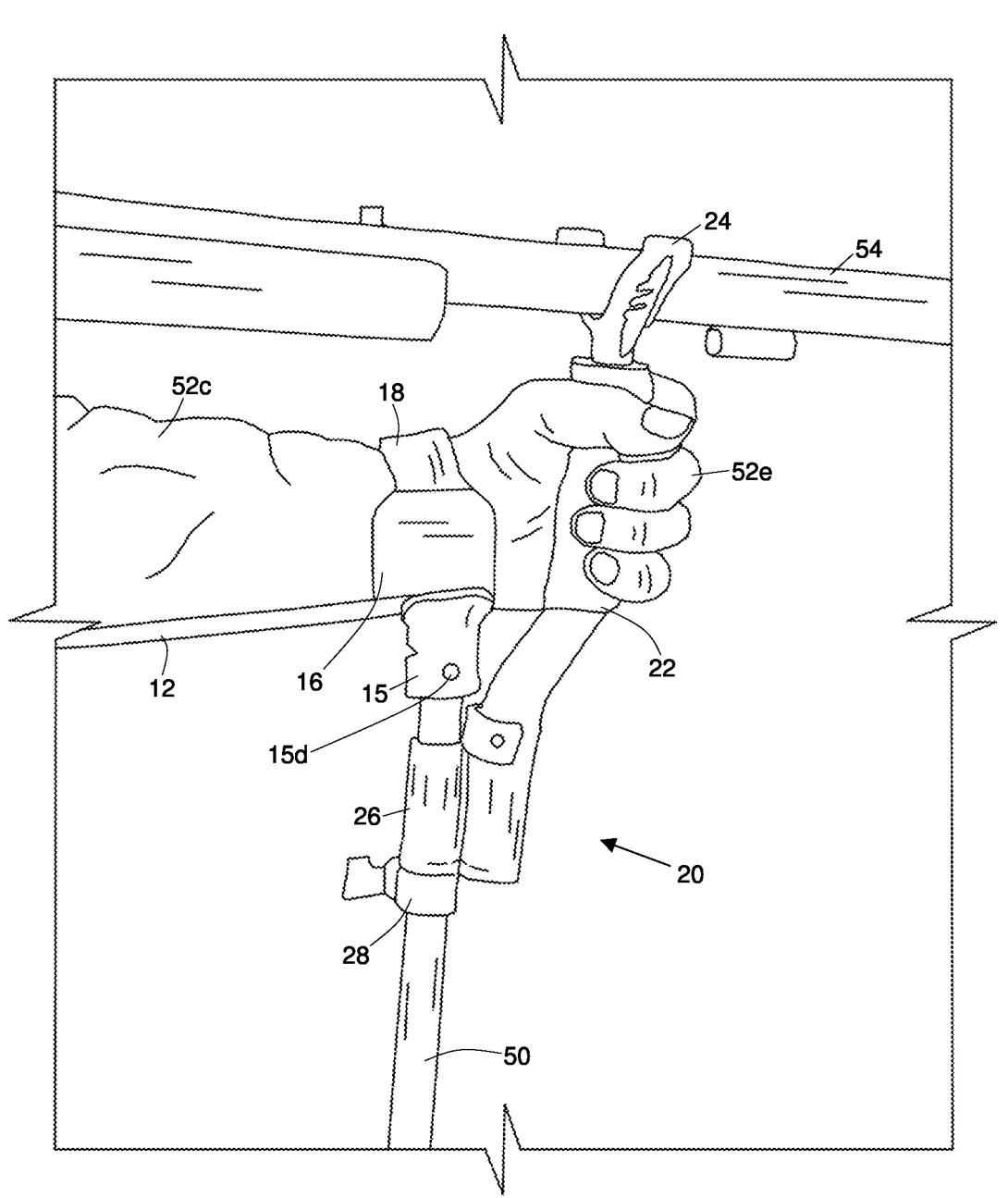
FIG. 11 is a second perspective view of FIG. 10, shown with a Y adaptor coupled to a threaded rod at its uppermost end of the universal stick adaptor assembly.
Figure 18:
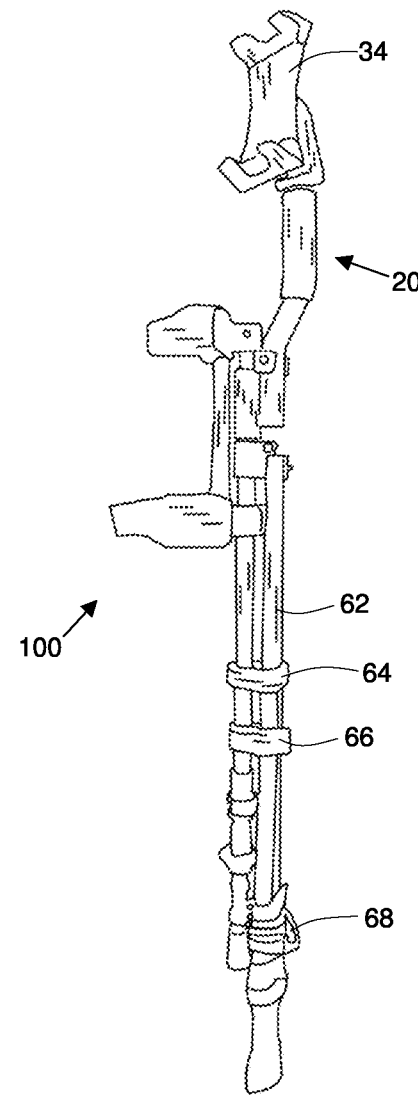
FIG. 18 is a perspective view of the shooting stick coupled to the forearm support and having extra legs attached thereto using the leg accessory kit in FIG. 17 and the leg coupler in FIG. 16 shown in a storage position.
Figure 19:
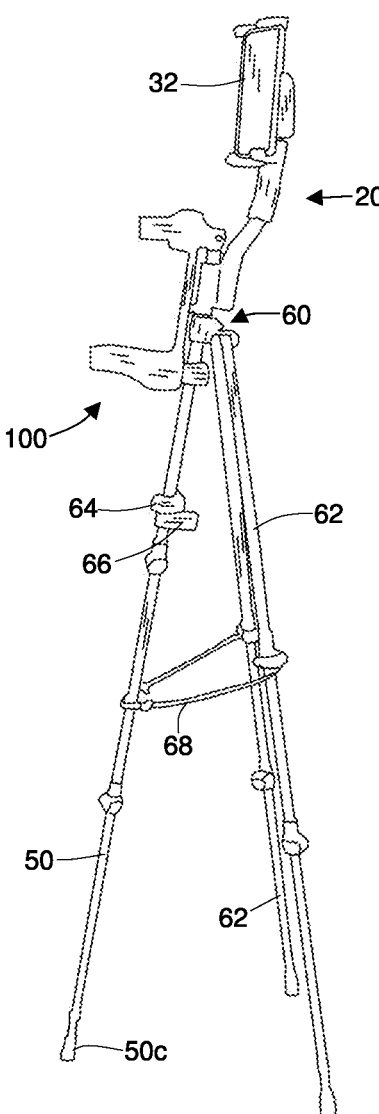
FIG. 19 is perspective view of FIG. 18, shown with the legs extended into a use position as a standalone tripod.
Figure 20:
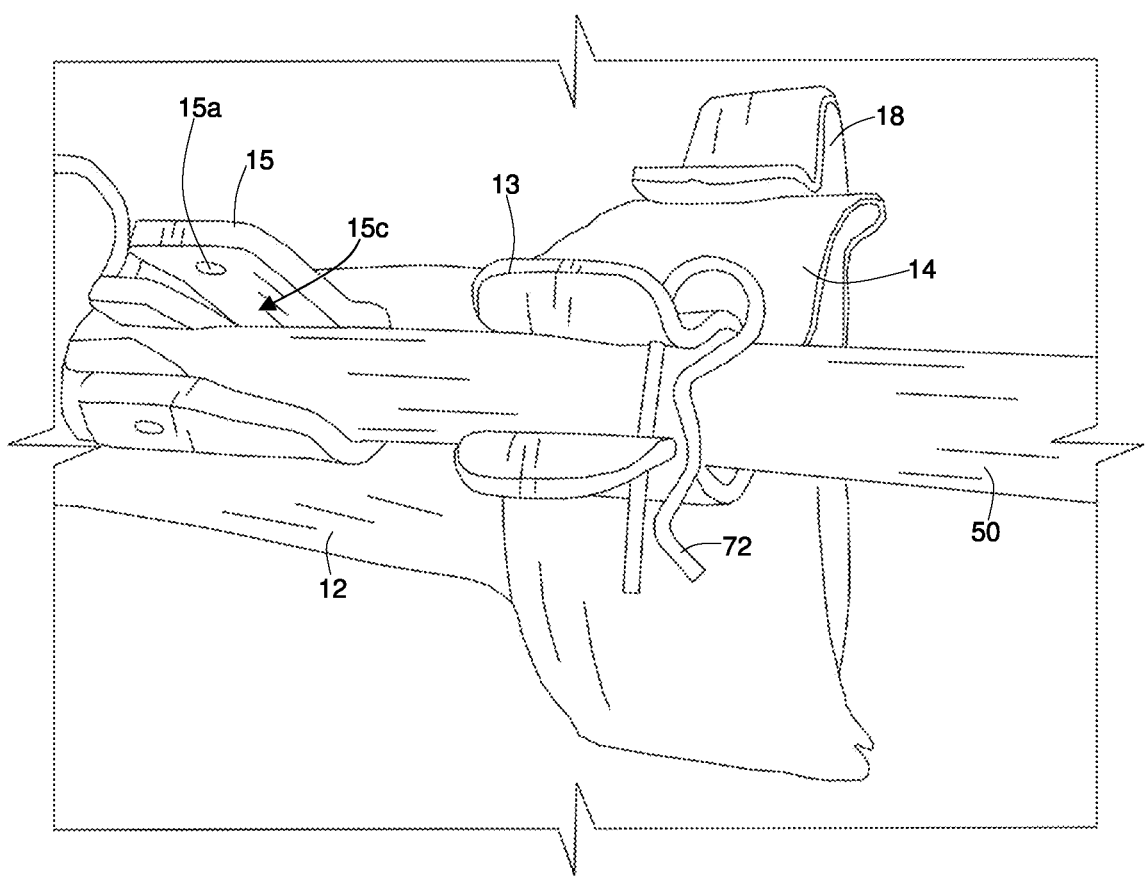
FIG. 20 is a perspective bottom view of the forearm support with the shooting stick coupled thereto, shown with the stick in a storage position.
Figure 21:
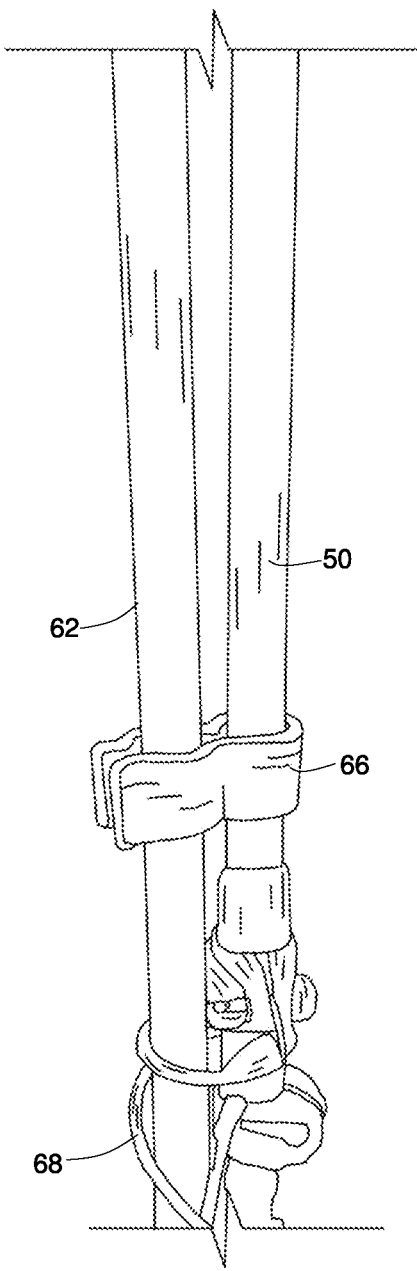
FIG. 21 is a detail view of the shooting stick coupled to an extra leg so as to form a bipod, shown in a storage position.
Figure 22:
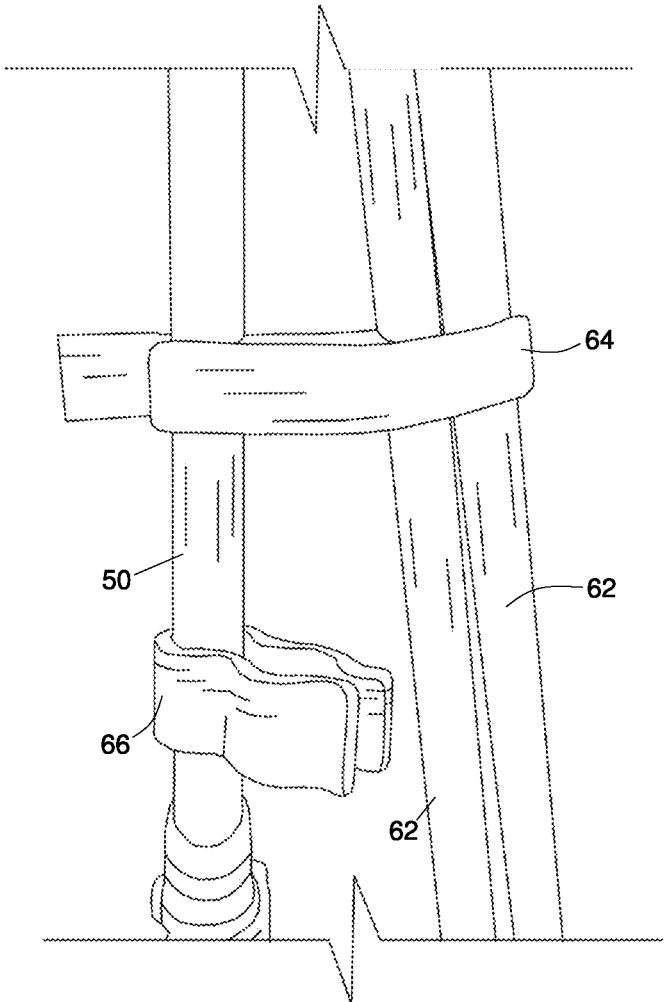
FIG. 22 is a detail view of the shooting stick coupled to a pair of extra legs so as to form a tripod, shown in a partial open position with the legs detached from the shooting stick but held together with a strap.

When the universal adaptor 20 is used with the assembly 100, for instance, in FIG. 11, the user's hand 52e grasps the hand grip 22 and the handle threaded coupler 22a is mated with an accessory such as the Y shaped yoke 24 in FIGS. 11 and 30, or a mobile device mount or camera mount 34 as shown in FIG. 18. The universal adaptor 20 provides the user 52 the ability to pivot and move the handle 22 freely from side to side while the lowermost end 50c of the shooting stick 50 remains stationary and provides the user 52 even more flexibility of use.

Figure 12:
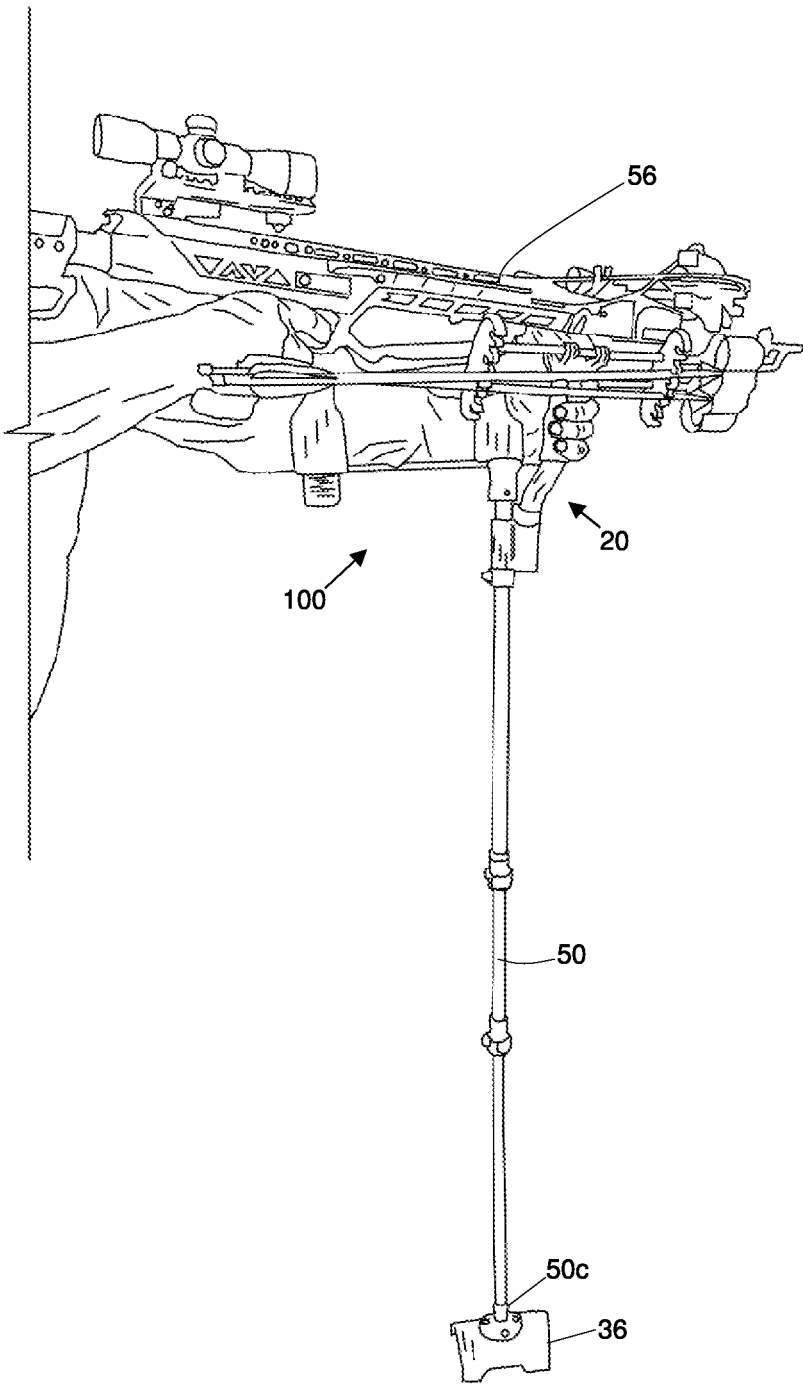
FIG. 12 is a second perspective view of FIG. 11, where the user is holding a bow supported by the Y adaptor in a use position.
Figure 13:
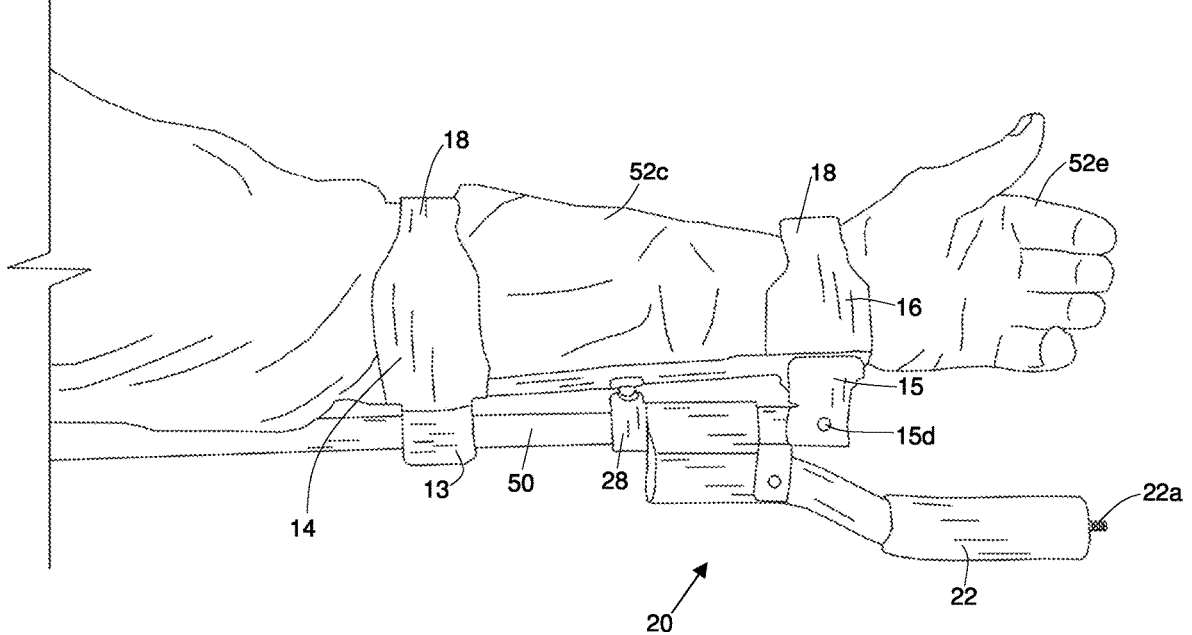
FIG. 13 is a perspective view of the universal adaptor assembly coupled to the forearm support and worn by the user, shown rotated away from the user's hand when released.

In FIG. 14 the user 52 is holding a compound bow 56 with the universal adaptor 20, but the hand grip 22 is rotated off to a side and the user's hand 52e is directly gripping the compound bow 56. Hence, installation of the universal adaptor 20 onto the shooting stick 50 still permits the user 52 to directly hold the bow 56 or can permit support by the yoke 24, such as shown in FIG. 12, where a crossbow 56 is shown. In this disclosure "bow" is a general terms that refers to all types of hunting bows. Hence, a bowhunter can optionally use a crossbow and switch to a compound bow easily in the field and then selectively hold the hand grip 22 or the bow directly, as needed.

The universal adaptor 20 uniquely solves the problem of smooth repositioning of the firearm 54, bow 56, etc. in a way that does not currently exist in the prior art. The prior art shooting sticks currently maintain stick position in one place. The user 52 must reposition the firearm 54, bow 56 etc. by repositioning the entire shooting stick 50, either by rotating the stick or by moving and prepositioning it. The universal adaptor 20 however allows for smooth, horizontal repositioning while the stick 50 remains stationary.

In FIG. 14, the hand grip 22 is pushed just to the side of the bow 56, and if the camera mount 34 is used with the handle threaded coupler 22a, the user 52 now has a convenient way to hold the mobile device camera 32 near the bow 56 or firearm 54, just off to the side, and thus record or photograph the shot taken by the user 52, something that cannot be currently achieved using the prior art shooting sticks without an additional tripod or other equipment. Many hunters are interested in recording or photographing their hunting shots and the assembly 100 and universal adaptor 20 provide this convenience. In the case of bow hunting, since the prior art shooting sticks are not usable with bows, not only does the assembly 100 allow the use of a shooting stick with a bow 56 but use with the universal adaptor 20 also eliminates a separate tripod or other equipment needed to record or photograph the user's shots.

The inventor notes that horizontal repositioning of an attachment to an otherwise stationary support has been solved in tripods by using a rotating top controlled by a handle that allows a mounted mobile device camera 32 or a standalone camera to be rotated while the tripod legs and base remain stationary. While this solution works well for a camera, it is not suitable for hunting, where the user 52 needs two hands to position the firearm 54 or bow 56 in a use position and there is no extra hand available to now hold and rotate a firearm or bow holding assembly. With the universal adaptor 20, the user 52 can maintain the user's hand 52e position on the firearm 54, bow 56 or mobile device camera 32 and move the firearm 54, bow 56 or mobile device camera 32 easily without adjusting hand 52e position. The prior art handle used with tripods is thus completely unsuitable for use with the assembly 100, adaptors 20 30 and accessories because it would necessarily require a secondary holder for the firearm 54, bow 56 or mobile device camera 32 to allow the user's hand 52 to be free to hold the handle, adding a level of complexity that defeats the spirit of the universal adaptor 20 and the assembly 100, whose aim is flexibility and simplicity. The inventor notes that since a bow 56 or firearm 54 requires the user's hands 52e for discharging, the tripod handle solution to smooth, horizontal movement cannot be easily adapted for use with the assembly 100 and universal adaptor 20 described herein.

The accessories for use with the assembly 100 are shown generally in FIGS. 16, 17, 26-28, and 30 and are comprised of support reducers 19 19a to adjust a size of the brace 12 as well as provide some padded comfort, if needed, the yoke 24, the mobile device camera mount 34, a ground support 36 for further ground stabilization, if needed or desired, a belt hanger 38, and additional legs 62 and leg accessories 60 64 66 68 70 allowing the user 52 a variety of different ways to use the assembly 100, including as a bipod or tripod as shown in FIGS. 18-19, and 21-24 when used with the legs 62 and leg accessories 60 64 66 68 70.

A leg coupler 60 is comprised of a leg clamp that allow the leg coupler 60 to be clamped to the shooting stick 50, and one or more leg clamps allowing one leg 62 to be attached to the leg coupler 60 for use as a bipod or to two legs 62 for use as a tripod. The accessories are optional and the user 52 can use none, some or all of the accessories as desired or needed.

Looking more specifically at the accessories, turning to the ground support 36, a central hole 36a sized and shaped to receive a lowermost end 50c of the stick 50 is typically either pressured fitted or threaded onto the stick lower end, as depicted in FIG. 32. The representative embodiment shown in the FIGS. shows the ground support 36 having a body shaped like a half pipe, with four feet for stability. The ground support 36 can also be configured a number of different ways, including a three legged tripod or "Christmas tree" type stand, a disc, or any other type of support that can laterally stabilize the stick 50. The inventor emphasizes that the representative embodiment in the FIGS. is not mean to limit the invention to just the structure shown but is meant to illustrate one useful embodiment and the idea that further lateral stabilization is suitable for use with the assembly 100.

One particularly useful accessory is the belt hanger 38, shown in FIGS. 26-29 worn by hooking the hook 46 over a user's pant waistband or belt 52b, the hook 46 formed into an upper end of the belt hanger 38. The belt hanger 38 has an elongated strap-like body with an upper stick receiver 40 and a lower stick receiver 42, both receivers 40 42 disposed as cups or cup-like elements formed into the belt hanger 38 sized and shaped to receive the lowermost end 50c of the shooting stick 50, and a leg strap 44 around a lowermost end of the hanger 38 to secure the hanger 38 to the leg 52a of the user 52. The belt hanger 38 allows the user 52 to support the shooting stick 50 against the user's leg 52a, which may be useful in conditions where support of the lowermost end 50c of the stick 50 against the ground surface is not possible, such as may be the case in water or swampy conditions where the ground surface is not solid, when the ground surface is rocky or otherwise uneven and insufficiently stable to support the shooting stick 50, as well as for hunting using a hunting saddle in a tree where there is nothing otherwise that can support the lowermost end 50c of the shooting stick 50 and thus deprives hunters or even photographers or videographers in hunting saddles the use of a shooting stick 50 for stability.

Currently, there is no way for a user 52 in a hunting saddle to support any prior art shooting stick 50, and the inventor notes that tree hunters will particularly benefit from his belt hanger 38 and assembly 100 as they simplify carrying equipment up a tree and provide much needed support and stability for the firearm 54 or bow 56 that is currently unavailable. The use of the belt hanger 38 also allows the user 52 to carry a shorter stick 50 which may be ideal for users wanting to limit weight or bulk. The hook 46 of the belt hanger 38 is a simple U end at its upper end that fits over the belt or waistband 52b of the user 52.

Figure 6:
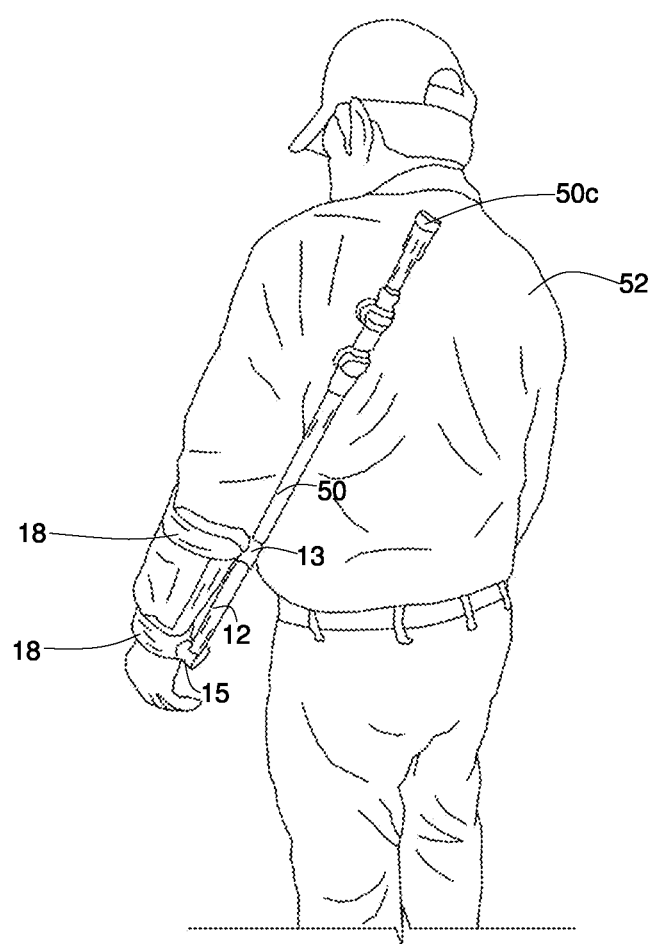
FIG. 6 is a perspective view of the user in FIG. 3 shown wearing the forearm support with the shooting stick attached thereto and positioned in a storage position.

An object of the assembly 100 is to allow the shooting stick 50 to be adjusted to an appropriate length once, then allow the stick 50 to be stored and transported at the adjusted length by simply pivoting the shooting stick 50 so as to be parallel with the support 10 and pressure snapped into the holder 13 of the assembly 100 near the user's elbow. The stick 50 is now fully adjusted and can be carried hands free, solving two major problems with current shooting sticks, the difficulty to transporting and storing a length adjusted stick and the nuisance of carrying the adjusted length stick by hand. Storing the stick securely along the back of the user's arm as shown in FIG. 6 is both convenient and out of the way, allowing the user 52 to walk around freely with the stick 50 in a hands-free location, or in the case of tree hunting, to climb a tree easily with the shooting stick 50 safely and conveniently stored along the user's arm. When the user 52 wants to use the stick 50, the stick is released from the holder 13 and pivoted to a desired location supported by the belt hanger 38 or the ground surface.

The assembly 100 and its adaptors 20 30 are unique and not found in the prior art as they allow both hands to be free when carrying the attached shooting stick 50. The storage location of the stick 50 along the back of the user's arm allows a hunter to move through a variety of terrains without the stick getting caught in brush or trees, avoiding unnecessary noise and movements that might otherwise spook the game animals.

The inventor notes that the term "shooting stick" and "stick" are inclusive of trekking poles and other supports with a threaded rod or aperture at its uppermost end and includes a variety of bipods and tripods. "Leg" or "legs" can also include trekking poles, legs specifically adapted for use with bipods or tripods, or even just sticks that the user 52 finds that are suitable for use.

The inventor notes that the assembly 100, adaptors 20 30 and accessories are particularly useful for bow hunting, and the FIGS. show a variety of different ways the invention can be used with compound bows and crossbows. The crossbow can be used with or without the universal adaptor 20, but the compound bow is held by the user's hand 52e, with the hand grip 22 rotated to the side, as shown in FIG. 14, allowing the user's hand 52e to directly grip the bow 56.

Since the shooting stick 50 is typically always attached to the user's wrist 52d, the user's arm height is maintained easily, reducing fatigue and increasing shot accuracy. The inventor is an avid bow hunter and his invention has allowed him to continue with his sport as he ages. He notes that his invention allows people with reduced arm strength to enjoy hunting and shooting as well as other activities that require steady arm control at a constant height. The inventor notes that the assembly 100, the adaptors 20 30 and the accessories can be used by right or left-handed people, and can help those with diminished hand strength, such as people with arthritis who cannot otherwise hold a firearm securely, still enjoy hunting due to the stability the invention offers.

The inventor notes that current shooting sticks are not useful for bow hunting, and as any bow hunter is aware, arm fatigue is a known issue that results in missed opportunities when hunting game. Given the amount of time that a bow hunter has to maintain his or her draw position, and the illegality of devices that keep the bow drawn in place, such designs arising out of a real need to reduce arm fatigue, many shots are missed because the hunter was unable to maintain position or get into position quickly enough without being seen when game appeared within range. The assembly 100, its adaptors 20 30 and accessories provide stable, quick and reliable support, as well as a hassle-free, hands-free experience.

Figure 15:
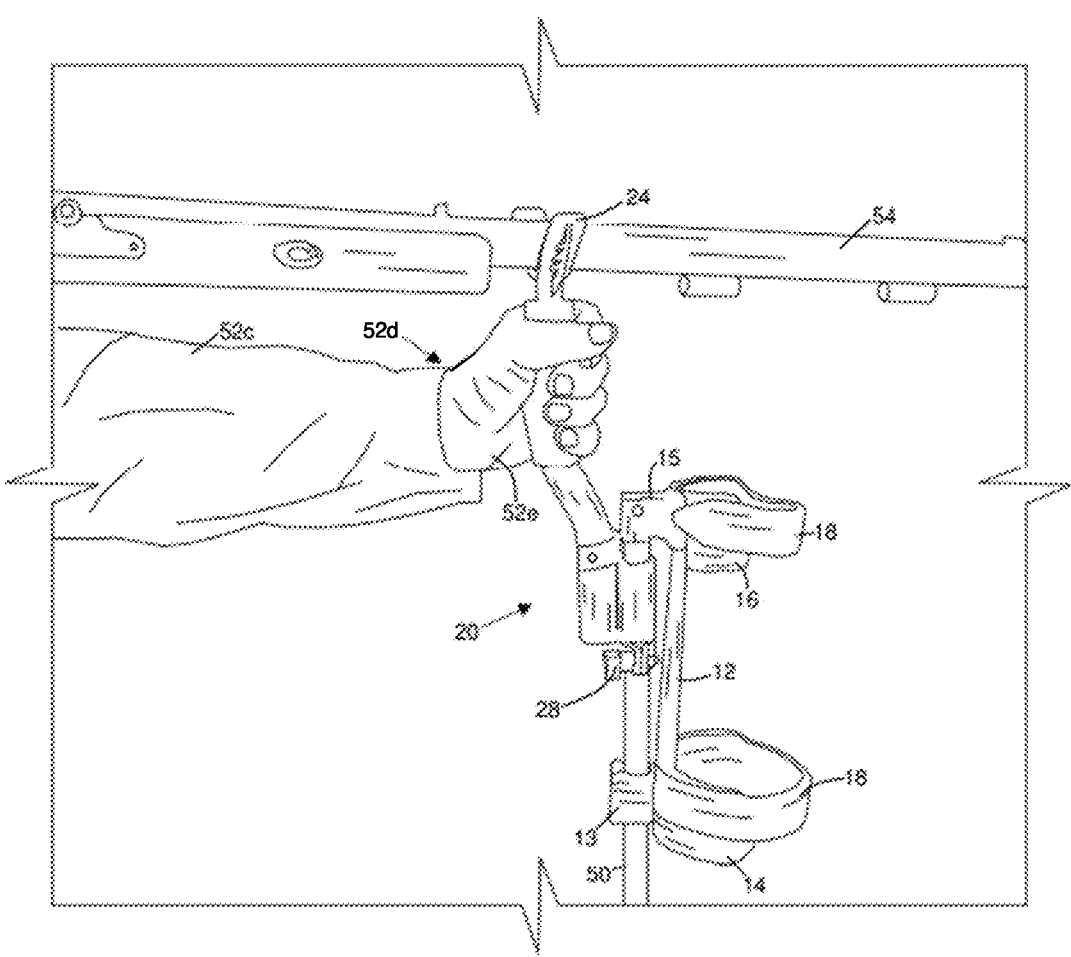
FIG. 15 is a perspective view of the universal adaptor assembly and forearm support, shown coupled together but not worn by the user, who holds the hand grip and supports a rifle with an attached Y adaptor.
Figure 16:
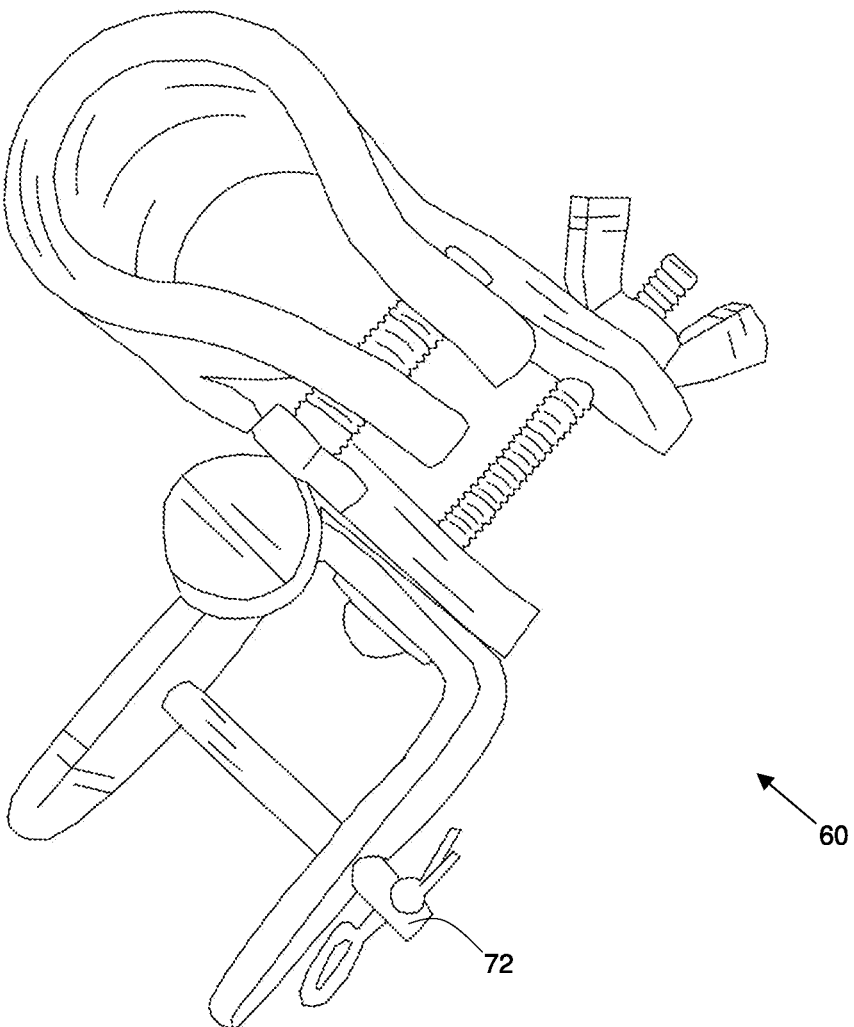
FIG. 16 is a leg coupler for use with the universal adaptor assembly.
Figure 17:
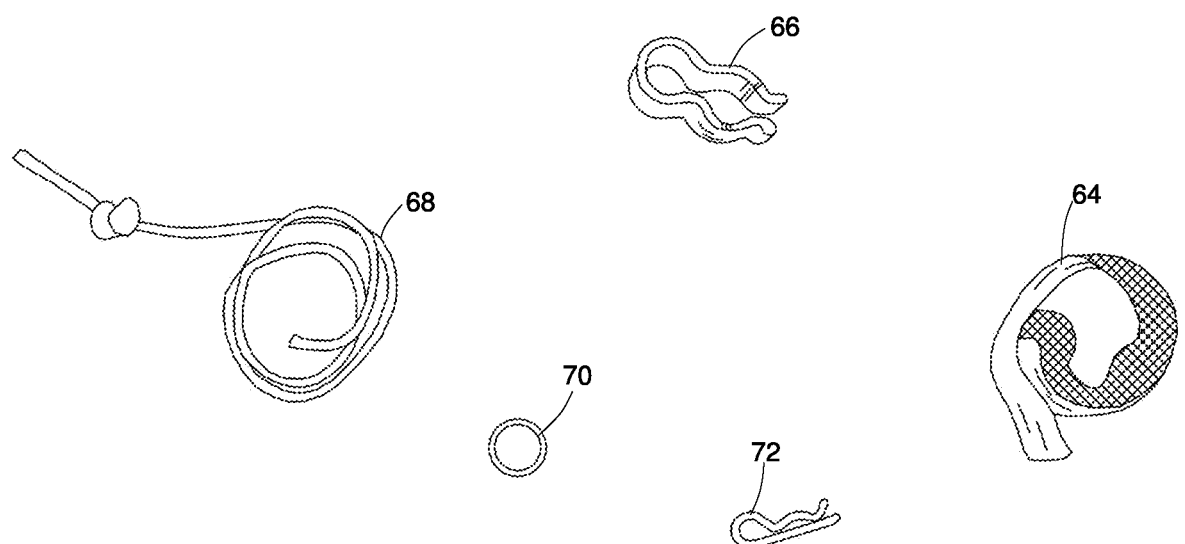
FIG. 17 is a perspective view of a bipod, tripod or leg assembly kit.

The inventor notes that in FIG. 15, his assembly 100 is shown attached to the shooting stick 50 but is not attached to the user's arm 50c. The assembly 100, adaptors 20 30, and accessories installed on the shooting stick 50 thus do not change the original function of the shooting stick 50 but rather provides the user 52 more use options.

It is to be understood that the above-described arrangements are only illustrative of the application of the principles of the present invention. Numerous modifications and alternative arrangements may be devised by those skilled in the art without departing from the scope of the present invention.

I claim:

1. An assembly adapted to be attached to a posterior side of a user's forearm and wrist and below an elbow of the user, the assembly adapted for use with a shooting stick having an upper end, a lower end, and a stick body between the upper and lower ends, and an adaptor having an adaptor receiver end and an adaptor stick end, the assembly comprising:
   a brace having an underside and an upper side, the upper side having first end with an arm cuff and a second end with a wrist cuff;
   wherein the underside extends below the wrist cuff;
   a receiver positioned on the underside below the wrist cuff;
   wherein the receiver has a wall with a gap, the wall having an upper wall end affixed to the underside and a lower wall end, and a first mating structure formed into the wall;
   wherein the lower wall end defines an opening adapted to separately pivotably couple to the upper end of the shooting stick or to the adaptor receiver end;
   wherein the upper end of the shooting stick and the adaptor receiver end are both adapted to pivotably couple to the receiver;

a first adjustable strap attached to the arm cuff;

a second adjustable strap attached to the wrist cuff; and a holder positioned below the arm cuff and having an opening facing away from the underside adapted to receive the stick body;

wherein the user's forearm is positioned inside the arm cuff and secured thereto by the first adjustable strap below the elbow of the user;

wherein the user's wrist is positioned inside the wrist cuff and secured thereto by the second adjustable strap; and wherein the posterior side of the user's forearm and wrist are immediately adjacent the upper side of the brace.

2. The assembly in claim 1, wherein each of the upper end of the shooting stick and the adaptor receiver end are further comprised of a second mating structure adapted to pivotably couple with the first mating structure.

3. The assembly in claim 1, wherein the first mating structure is an aperture formed into the receiver sized, shaped, and adapted for use to receive a push button telescoping tube lock provided on either the adaptor or the upper end of the shooting stick.

4. The assembly in claim 1, wherein the brace is concave shaped.

5. The assembly in claim 2, further comprising a removable fastener, wherein the first mating structure is a pair of aligned apertures formed into the receiver and sized and shaped to receive the removable fastener, and wherein the second mating structure is an aperture adapted to be used with the removable fastener.

6. The assembly in claim 5, wherein the removable fastener is a clevis pin.

7. The assembly in claim 2, wherein the shooting stick is further comprised of a length telescopically adjustable from 24 to 58 inches.

8. The assembly in claim 1, further comprising a ground support having two or more feet in spaced apart relationship, and a hole adapted to receive the lower end of the shooting stick.

9. A belt hanger for use with the assembly in claim 1, comprising:

a body having a belt end formed with a hook and an opposed stick end formed with a lower stick receiver disposed as a cup adapted for use to receive the lower end of the shooting stick; and an adjustable strap attached to the stick end.

10. A leg coupler for use with the assembly in claim 1 and for use with a leg, comprising:

a stick clamp adapted for use to receive the stick body; and a leg clamp adapted to receive the leg, whereby the shooting stick is converted for use as a bipod.

11. An assembly adapted to be attached to a posterior side of a user's forearm and wrist, and below an elbow of the user, the assembly adapted for use with both a shooting stick having an upper end, a lower end, and a stick body between the upper and lower ends, and an adaptor having an adaptor receiver end and an adaptor stick end, the assembly comprising:

a brace having an underside and an upper side, the upper side having first end with an arm cuff and a second end with a wrist cuff;

wherein the underside extends below the wrist cuff;

a receiver positioned on the underside below the wrist cuff;

wherein the receiver has a wall with a gap, the wall having an upper wall end affixed to the underside and a lower wall end, and a first mating structure formed into the wall;

wherein the lower wall end defines an opening adapted to separately pivotably couple to the upper end of the shooting stick or to the adaptor receiver end;

wherein the upper end of the shooting stick and the adaptor receiver end are both adapted to pivotably couple to the receiver and are each further comprised of a second mating structure adapted to pivotably couple with the first mating structure;

wherein the upper end of the shooting stick is further formed with a threaded rod, and the adaptor stick end is further formed with a threaded hole adapted to couple with the threaded rod when the adaptor receiver end is coupled to the opening, and the shooting stick is coupled to the adaptor stick end;

a first adjustable strap attached to the arm cuff;

a second adjustable strap attached to the wrist cuff; and a holder positioned below the arm cuff and having an opening facing away from the underside adapted to receive the stick body;

wherein the user's forearm is positioned inside the arm cuff and secured thereto by the first adjustable strap below the elbow of the user;

wherein the user's wrist is positioned inside the wrist cuff and secured thereto by the second adjustable strap; and wherein the posterior side of the user's forearm and wrist are immediately adjacent the upper side of the brace.

12. The assembly in claim 11, further comprising a removable fastener, wherein the first mating structure is disposed as a pair of receiver apertures formed into the receiver, and wherein the adaptor receiver end is further formed with the second mating structure disposed as an adaptor aperture sized and shaped to receive the removable fastener and positioned on the adaptor such that the adaptor aperture aligns with the pair of receiver apertures of the receiver when the adaptor receiver end is positioned inside the opening.

13. A universal adaptor adapted for use with both a shooting stick having an upper end, a lower end, and a stick body between the upper and lower ends, and an arm brace assembly adapted to be attached to a posterior side of a user's forearm and wrist, the arm brace assembly comprising:

a brace with an upper side and an underside, an arm cuff with a first strap attached to the arm cuff at a first end of the brace, and a wrist cuff with a second strap attached to the wrist cuff on the upper side of the brace at a second end of the brace;

wherein the underside extends below the wrist cuff;

a holder attached below the arm cuff adapted to receive the stick body;

a receiver attached to the underside below the wrist cuff;

wherein the receiver has a wall with a gap, the wall having an upper wall end affixed to the underside and a lower wall end, and a first mating structure formed into the wall;

wherein the lower wall end defines an opening adapted to receive the upper end of the shooting stick;

wherein the user's forearm is positioned inside the arm cuff and secured thereto by the first adjustable strap;

wherein the user's wrist is positioned inside the wrist cuff and secured thereto by the second adjustable strap; and wherein the posterior side of the user's forearm and wrist are immediately adjacent the upper side of the brace; and the universal adaptor comprising:

a stick sleeve having an interior space sized and shaped and adapted for use to rotatably house the stick body, the stick sleeve further having an exterior side;

a clamp adapted for use to adjustably clamp to the shooting stick below the stick sleeve, whereby the clamp is adapted for use to maintain a position of the shooting stick within the stick sleeve;

a hand grip having a grip upper end, the hand grip affixed to the exterior side of the stick sleeve; and a handle threaded coupler formed into the grip upper end.

14. The universal adaptor in claim 13, wherein the handle threaded coupler is adapted to couple to a yoke accessory.

15. The universal adaptor in claim 13, wherein the handle threaded coupler is adapted to couple to a mobile device camera holding accessory.

16. The universal adaptor in claim 13, wherein the handle threaded coupler has a ¼-20 thread size.

17. An accessory kit for use with the universal adaptor in claim 13, comprising:

an adjustable length leg;

a leg coupler having a stick clamp adapted for use with the shooting stick and a leg clamp adapted for use to clamp to the leg; and a clip adapted for use to receive the adjustable length leg and adapted for receiving the body of the shooting stick.

\*   \*   \*   \*   \*